United States Patent
Feng et al.

(10) Patent No.: US 11,776,286 B2
(45) Date of Patent: Oct. 3, 2023

(54) IMAGE TEXT BROADCASTING

(71) Applicant: NEXTVPU (SHANGHAI) CO., LTD., Shanghai (CN)

(72) Inventors: Xuanyang Feng, Shanghai (CN); Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 110 days.

(21) Appl. No.: 17/164,744

(22) Filed: Feb. 1, 2021

(65) Prior Publication Data

US 2021/0248406 A1    Aug. 12, 2021

Related U.S. Application Data

(63) Continuation of application No. PCT/CN2020/123195, filed on Oct. 23, 2020.

(30) Foreign Application Priority Data

Feb. 11, 2020   (CN) .......................... 202010085671.8

(51) Int. Cl.
*G06V 30/148* (2022.01)
*H04H 60/20* (2008.01)
(Continued)

(52) U.S. Cl.
CPC ............ *G06V 30/153* (2022.01); *G06V 20/62* (2022.01); *H04H 60/19* (2013.01); *H04H 60/20* (2013.01); *G06V 30/10* (2022.01)

(58) Field of Classification Search
CPC ...... G06V 20/62; G06V 3/0153; H04N 60/19; H04H 60/20
See application file for complete search history.

(56) References Cited

U.S. PATENT DOCUMENTS 9,292,739 B1 *   3/2016   Gray .................... G06V 10/987
9,510,044 B1 *   11/2016  Pereira ............. H04N 21/44204
(Continued)

FOREIGN PATENT DOCUMENTS

CN        106022332 A      10/2016
CN        107393356 A      11/2017
(Continued)

OTHER PUBLICATIONS

Fei, et al., "Design and implementation of mobile photo-reading system", School of Mathematics & Information Engineering, Taizhou University, China, 2017, pp. 1-5.

*Primary Examiner* — Edward Park
(74) *Attorney, Agent, or Firm* — KILPATRICK TOWNSEND & STOCKTON LLP

(57) ABSTRACT

An image text broadcasting method, an electronic device, and a storage medium are provided. The image text broadcasting method includes: receiving a specified broadcast indication; determining a current broadcast progress about broadcast data in response to the specified broadcast indication; acquiring a next piece of broadcast data from a first text according to the current broadcast progress and the specified broadcast indication, in which the first text is composed of text data recognized and stored for a text in a text area of an image.

16 Claims, 15 Drawing Sheets

(51) Int. Cl.
*H04H 60/19* (2008.01)
*G06V 20/62* (2022.01)
*G06V 30/10* (2022.01)

(56) References Cited

U.S. PATENT DOCUMENTS

| | | | |
|---|---|---|---|
| 10,467,466 | B1 | 11/2019 | Cai et al. |
| 2004/0170392 | A1* | 9/2004 | Lu .......................... H04H 60/59 348/E5.123 |
| 2014/0324436 | A1 | 10/2014 | Ye et al. |
| 2016/0078488 | A1* | 3/2016 | Simo .................. G06Q 30/0269 705/14.66 |
| 2018/0239512 | A1 | 8/2018 | Shetty et al. |
| 2019/0132648 | A1* | 5/2019 | Zimmerman ......... G06F 1/1694 |
| 2019/0205708 | A1 | 7/2019 | Liu et al. |
| 2019/0312973 | A1* | 10/2019 | Engelke .............. H04M 1/2475 |
| 2022/0215452 | A1* | 7/2022 | Alikov ............... G06Q 30/0643 |

FOREIGN PATENT DOCUMENTS

| | | |
|---|---|---|
| CN | 107885826 A | 4/2018 |
| CN | 108366182 A | 8/2018 |
| CN | 108665742 A | 10/2018 |
| CN | 108874356 A | 11/2018 |
| CN | 110111612 A | 8/2019 |
| CN | 110245606 A | 9/2019 |
| CN | 110277092 A | 9/2019 |
| CN | 110287830 A | 9/2019 |
| CN | 110991455 A | 4/2020 |
| JP | 2014127197 A | 7/2014 |
| JP | 2018180590 A | 11/2018 |
| JP | 2019040005 A | 3/2019 |
| KR | 20130113250 A | 10/2013 |
| KR | 20140019167 A | 2/2014 |
| KR | 20190094315 A | 8/2019 |

* cited by examiner

| Position | Cut-off proportion |
|----------|-------------------|
| 002 | 32% |
| 003 | 69% |
| 004 | 100% |

FIG. 3B

Broadcast data

肇观电子致力于计算机视觉处

理器和人工智能应用产品的创新和

研发，为机器人、无人机、无人

| Position | Cut-off proportion |
|----------|-------------------|
| 002 | 32% |
| 003 | 69% |
| 004 | 100% |

FIG. 3C

IMAGE TEXT BROADCASTING

CROSS-REFERENCES TO RELATED APPLICATIONS

This application claims priority to and is a continuation application of International Patent Application No. PCT/CN2020/123195, filed on Oct. 23, 2020, which claims priority to and benefits of Chinese Patent Application No. 2020100856718, filed on Feb. 11, 2020. The entire contents of the PCT/CN2020/123195 application are incorporated by reference herein in their entirety for all purposes.

TECHNICAL FIELD

The present disclosure relates to the field of image processing and text broadcasting technologies, and more particular, to an image text broadcasting method, an electronic device, and a storage medium.

BACKGROUND

In recent years, image processing and broadcasting technologies have been widely used in various fields, and the broadcasting technology of image texts has always been one of the focuses in the industry.

The methods described in this section are not necessarily methods that have been previously conceived or adopted. It should not be assumed that any of the methods described in this section are considered as prior art merely by virtue of their inclusion in this section, unless otherwise indicated. Similarly, the problem mentioned in this section should not be considered to be recognized in any prior art, unless otherwise indicated.

BRIEF SUMMARY OF THE INVENTION

According to an aspect of the present disclosure, an image text broadcasting method is provided. The method includes: receiving a specified broadcast indication; determining a current broadcast progress about broadcast data in response to the specified broadcast indication; acquiring a next piece of broadcast data from a first text according to the current broadcast progress and the specified broadcast indication, in which the first text is composed of text data recognized and stored for a text in a text area of an image.

According to another aspect of the present disclosure, an electronic device is provided, which includes a processor, and a memory storing a program. The program including instructions that, when executed by the processor, cause the electronic device to perform the method according to the present disclosure.

According to another aspect of the present disclosure, a non-transitory computer-readable storage medium storing a program is provided, the program including instructions that, when executed by a processor of an electronic device, cause the electronic device to perform the method according to the present disclosure.

BRIEF DESCRIPTION OF THE DRAWINGS

The drawings, which exemplarily illustrate embodiments and constitute a part of the specification, together with the text description of the specification, serve to explain exemplary implementations of the embodiments. The illustrated embodiments are for illustrative purposes only and do not limit the scope of the claims. Throughout the drawings, the same reference signs denote similar but not necessarily the same elements.

FIG. 2 illustrates an exemplary image including a text area, and the text area including multiple text lines;

FIGS. 3A, 3B, and 3C illustrate a method and process of determining association information according to another exemplary embodiment of the present disclosure;

DETAILED DESCRIPTION OF THE INVENTION

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

Although image processing technologies related to character recognition have been widely used in various fields, there are still some challenges in image text broadcasting.

For example, a user (for example, a visually impaired user and a hearing-impaired user) may need to rehear some of previous content in the broadcasting process. Although forward and backward broadcast functions are supported in an ebook scene and an audio broadcast scene, forward and backward speech broadcast functions are not supported currently in a text-to-speech (TTS) broadcast scene. TTS is a kind of speech synthesis application, it can convert stored text data into natural speech output, and its speech broadcast function brings much convenience to users. However, the speech broadcast of TTS is instantaneous, it will broadcast immediately after detection and recognition, and it cannot support forward and backward broadcast.

In addition, in the present disclosure, broadcasting is not limited to speech broadcasting such as TTS, and more types of broadcast functions can be supported, such as vibration broadcasting for visually impaired users and hearing-impaired users such as deaf-mute persons.

Figure 1:
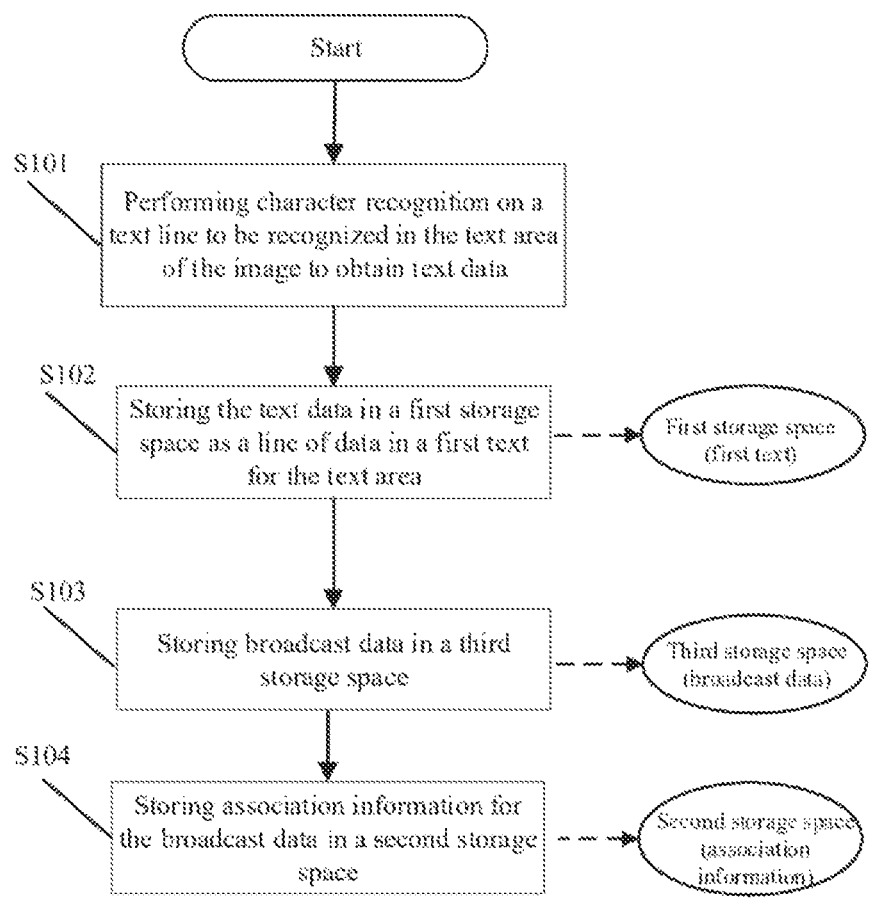
FIG. 1 is a flowchart illustrating an image text broadcasting method according to exemplary embodiments of the present disclosure.

The present disclosure provides an image text broadcasting method. FIG. 1 is a flowchart illustrating an image text broadcasting method according to exemplary embodiments of the present disclosure.

In the present disclosure, the text line refers to a sequence of characters with adjacent character spacing less than a threshold spacing, that is, a continuous line of characters. The adjacent character spacing refers to a distance between coordinates of corresponding positions of adjacent characters, e.g., a distance between upper-left corner coordinates of adjacent characters, a distance between lower-right corner coordinates of adjacent characters, or a distance between centroid coordinates of adjacent characters. When the adjacent character spacing is not greater than the threshold spacing, the adjacent characters may be considered to be continuous and they may be divided into the same text line. When the adjacent character spacing is greater than the threshold spacing, the adjacent characters may be considered to be discontinuous (for example, they may belong to different paragraphs or belong to left and right columns, respectively), and they may be divided into different text lines. The threshold spacing may be set according to the character size, for example, the threshold spacing set for adjacent characters with a font size greater than 14 point (such as 16 point, or 22 point) may be greater than the threshold spacing set for adjacent characters with a font size less than 14 point (such as 12 point, or 10.5 point).

Figures 2, 3A:

Illustratively, the image illustrated in FIG. 2 includes a text area. The text area includes 12 text lines (text in lines 1-12), and the 12 text lines are divided into two sections ("section" herein may refer to a paragraph or a natural section), where the first section has 5 lines, and the second section has 7 lines. It may be understood that, an image is not limited to only having one text area, but may also have multiple text areas, and each text area in the image can be processed by using the image text broadcasting method in the present disclosure.

As illustrated in FIG. 1, the image text broadcasting method according to exemplary embodiments of the present disclosure includes: performing character recognition on a text line to be recognized in the text area of the image to obtain text data (block S101); storing the text data in a first storage space as a line of data in a first text for the text area (block S102); storing broadcast data in a third storage space (block S103); and storing association information for the broadcast data in a second storage space (block S104), the association information is used for making the broadcast data in the third storage space positionally correspond to corresponding data in the first text in the first storage space.

At block S101, character recognition is performed on the text line to be recognized in the text area of the image to obtain the text data.

According to some embodiments, as described above, the image may include one or more text areas. Each text area may include at least two lines of characters (at least two text lines), and the characters may be, for example, in various forms (including various characters, digits, etc.). In addition to the text area, the image may further include pictures, etc.

According to some embodiments, the image may be a pre-screened image, for example, a relatively sharp image selected from multiple photographed images.

According to some embodiments, the image may be an image captured by a camera, or an image that has been pre-processed based on the image captured by the camera. The pre-processing may include, for example, denoising, contrast enhancement, resolution processing, greyscale processing, blur removal, etc.

According to some embodiments, the camera may be, for example, disposed on the device such as a wearable device or glasses of the user.

Here, the camera for capturing the image can perform static or dynamic image capture. The camera may be an independent device (such as a camera, a video camera, a camera lens, etc.), or may be included in various electronic devices (such as a mobile phone, a computer, a personal digital assistant, a broadcasting apparatus, a tablet computer, a reading assisting device, a wearable device, etc.).

According to some embodiments, character recognition may be performed on the text line by, for example, an optical character recognition OCR method, so as to obtain text data of the text line.

According to some embodiments, text line detection may be performed after image acquisition and before character recognition.

According to some embodiments, each text line to be recognized in the text area may be detected and recognized in sequence to obtain text data of the text line.

Taking the image illustrated in FIG. 2 as an example, character recognition may be performed on the first text line to obtain text data of the first text line (["肇观", 即"开启视觉"。]) (Chinese characters, which mean ["NextVPU", i.e., "Next Vision Processing Unit".]). Then, character recognition may be performed on subsequent text lines in sequence to obtain corresponding text data.

It may be understood that, it is not necessary to start detection and recognition from the first line of the text area, but also other lines.

At block S102, the text data is stored in the first storage space as a line of data in the first text for the text area. The recognized text data may be stored in the first storage space line by line, such that each line of text data in the first storage space is in a one-to-one correspondence with each text line in the text area.

According to some embodiments, the recognized text data of the text line may be stored in the first storage space, and may be stored as a line of data in the first text during storage. For example, the recognized text data may be stored in lines according to the presentation form in the text area of the image. For example, when recognized text data of a text line in the text area is stored in the first storage space, it is also stored as a line of data to facilitate subsequent processing.

In the present disclosure, the text data of each text line recognized for the text area may be stored in the first storage space as a line of data of the first text. Thereby, each line of data in the first text corresponds to each text line in the text area.

For ease of description, blocks S101 and S102 are described separately as different steps. In other examples, blocks S101 and S102 may be in the same step.

At block S103, the broadcast data is stored in the third storage space.

According to some embodiments, the third storage space is configured to store the broadcast data. The broadcast data in the third storage space may be broadcast data supporting sequential broadcasting, or may be broadcast data supporting specified broadcasting. Here, the broadcast data is not necessarily stored in the original form of lines in the third storage space, it may not be stored in lines, or may be stored in lines, which is not limited in the present disclosure.

In addition, there may be various processing methods for storage duration of the broadcast data in the third storage space. For example, each piece of broadcast data may be stored for a relatively long time, and broadcast data may be retained even when it has been broadcasted, such that the integrity of broadcast data can be maintained during the entire broadcast period. Alternatively, broadcast data may be removed or covered after being broadcasted, so as to save storage space.

At block S104, the association information for the broadcast data is stored in the second storage space.

According to some embodiments, the association information is used for making the broadcast data in the third storage space positionally correspond to the corresponding data in the first text in the first storage space.

Here, the broadcast data being positionally corresponding to the corresponding data in the first text may indicate that there is a positional correspondence between the broadcast data and the corresponding data in the first text. For example, when the broadcast data is the same as the corresponding data, the position of the corresponding data in the first text is the position of the broadcast data in the first text. Certainly, the broadcast data may be different from the corresponding data, and through the association information, the positional correspondence between the broadcast data and the corresponding data may be established, so as to facilitate data management and retrieval.

As described above, at present stage, TTS broadcasting does not support the forward and backward function like in ebook or audio broadcast scenes. In the present disclosure, the second storage space is provided and the association information is stored in the storage space, such that the broadcast data in the third storage space can be positionally corresponded to the corresponding data in the first text in the first storage space through the association information, thereby making it possible to implement the forward and backward function of TTS broadcasting. That is, the above blocks S101 to S104 make sufficient preparations to support the forward and backward function of TTS broadcasting.

It may be understood that, although FIG. 1 exemplarily illustrates the above-mentioned storing steps, the present disclosure is not limited to the execution order of steps illustrated in the drawings. For example, especially during subsequent broadcasting, the storing and broadcasting in the present disclosure may be operations performed in parallel, in many cases, the time sequence or the specific execution order is not required, and it can be flexibly processed according to actual situations.

According to some embodiments, the above-mentioned first, second, and third storage spaces are storage areas named to distinguish storage of different data. Actually, these storage spaces may be in the same storage apparatus (for example, a memory), or may be in different storage apparatuses respectively, or two of the storage spaces are in the same storage apparatus, and the other storage space is separately in another storage apparatus. In addition, in terms of data storage, it is not necessary to use three different storage areas (in the same storage apparatus or not in the same storage apparatus) for storing the data, although they are named three storage spaces having different names.

According to some embodiments, the association information for the broadcast data may include at least: a position, in the first text, of each line of data in the corresponding data positionally corresponding to the broadcast data; and a cut-off proportion in the corresponding data for each line of data in the corresponding data.

Here, the cut-off proportion in the corresponding data for each line of data in the corresponding data is determined based on the proportion of the number of characters from a start line of data in the corresponding data to the line of data to the total number of characters of the corresponding data.

According to some embodiments, the position, in the first text, of each line of data in the corresponding data may include a line number, a paragraph number, etc. of the line of data. For example, a value such as "00*" may be used to represent the line number of a line of data. For example, "002" may indicate that, in the first text, the line of data is in the second line. The paragraph number may be represented similarly. In the present disclosure, other methods for representing the position are also included, which is not repeatedly described here.

For ease of understanding and description, it is now assumed that the broadcast data is the same as the corresponding data, and the line number is used to represent the position as described above, and it is assumed that the corresponding data and the broadcast data include text data of the second, third, and fourth text lines (the three lines marked with a rectangular box, which are used as data of the first, second, and third lines in the broadcast data) in the text area illustrated in FIG. 3A.

The number of characters in a text line may represent the number of characters in the line of text. Assuming that a Chinese character is equal to 2 characters, and an English letter, a digit (or digital symbol), or a punctuation symbol is equal to 1 character, for example, the number of characters in a line of data may be determined as: the number of characters in a line of data=the number of Chinese characters in the line×2+the number of English letters in the line+the number of digital symbols in the line+the number of punctuation symbols in the line.

It should be noted that other methods can also be used to calculate the number of characters in the line of data, and the present disclosure is not limited to the illustrative method described here.

For example, the number of characters in text data ["肇观", 即"开启视觉"。] (Chinese characters, which mean ["NextVPU", i.e., "Next Vision Processing Unit".]) in the first line in FIG. 3A is 20, which is specifically: 7×2 (7 Chinese characters)+6 (6 punctuation symbols)=20 (characters).

By using the above method for calculating the number of characters, it can be determined that the numbers of characters in the three lines of data in the corresponding data (that is, the broadcast data) are respectively: 26, 30, and 25. Then, the total number of characters of the corresponding data is 26+30+25=81.

Then, a cut-off proportion of each line of data in the corresponding data can be calculated as follows:

the cut-off proportion of the first line of data in the corresponding data is: 26/81=32% (corresponding to the second text line in the text area);

the cut-off proportion of the second line of data in the corresponding data is: (26+30)/81=69%; and the cut-off proportion of the third line of data in the corresponding data is: (26+30+25)/81=100%.

It may be understood that the cut-off proportion of the last line is generally 100%. Thus, the cut-off proportion of the last line can also be directly determined as 100% without calculation.

The obtained cut-off proportions can be stored in the second storage space together with corresponding positions (002, 003, 004), and thus the association information for the broadcast data stored in the second storage space can be illustrated in FIG. 3B.

In order to explain the meaning of "cut-off proportion", the method for calculating a cut-off proportion by using the number of characters is illustrated above, and the cut-off proportion of each line of data can also be determined based on other parameters, which is not repeatedly described here.

In addition, according to some embodiments, the corresponding data positionally corresponding to the broadcast data currently being broadcasted may be further stored in the second storage space. In the case that the broadcast data is the same as the corresponding data, as illustrated in FIG. 3C, it can be easy to establish the correspondence between the broadcast data and the corresponding data, and the specific information of the broadcast data can be accurately obtained.

As described above, the broadcast data stored in the third storage space may be broadcast data supporting sequential broadcasting (for example, broadcasted line by line), or may be broadcast data supporting specified broadcasting (for example, broadcasting supporting the forward and backward functions), that is, broadcast data organized based on the broadcast position required for specified broadcasting.

Since the broadcast data may be continuously updated or changed, in the present disclosure, the organization and storage of the broadcast data may be performed according to requirements, and details will be described below with reference to FIG. 5A.

Figure 4:
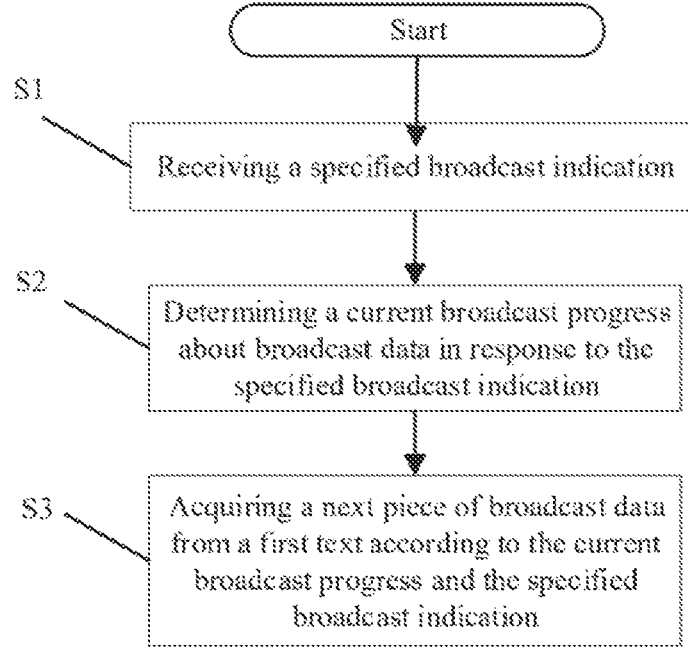
FIG. 4 is a flowchart illustrating an image text broadcasting method according to another exemplary embodiment of the present disclosure.

In the present disclosure, both sequential broadcasting and specified broadcasting can be supported. FIG. 4 is a flowchart illustrating an image text broadcasting method supporting specified broadcasting according to another exemplary embodiment of the present disclosure.

As illustrated in FIG. 4, first, at block S1, a specified broadcast indication is received.

The specified broadcast indication may be used for indicating that the user requires the broadcasting apparatus to broadcast specified data, for example, broadcast a specified text unit (for example, the previous several lines or the following several lines).

At block S2, a current broadcast progress about broadcast data is determined in response to the specified broadcast indication.

When the user wants the broadcasting apparatus to perform specified broadcasting (for example, broadcasting a previous line), the broadcasting apparatus may be in the broadcasting process. Thus, in order to determine the position of the specified data that the user requires, the current broadcast progress of the broadcasting apparatus needs to be determined first.

At block S3, a next piece of broadcast data is acquired from a first text according to the current broadcast progress and the specified broadcast indication.

Based on the current broadcast progress and the specified broadcast indication, the start position of the next piece of broadcast data may be determined, and Thus, the broadcast data that the user requires (i.e., the next piece of broadcast data) can be acquired from the first text used for storing text data.

The first text may be composed of text data recognized and stored for the text in the text area of an image.

Thus, the present disclosure can support specified broadcasting.

In the following, the sequential broadcasting process and the specified broadcasting process will be described in details.

Figure 5A:
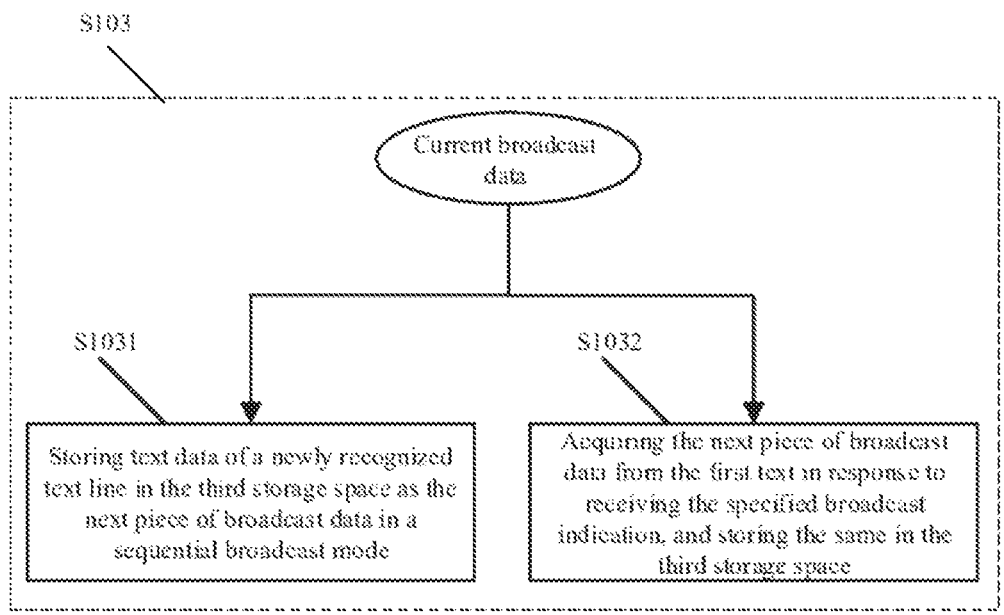
FIG. 5A illustrates a process of preparing broadcast data according to exemplary embodiments of the present disclosure.

According to some embodiments, as illustrated in FIG. 5A, the block S103 of storing broadcast data in the third storage space may include blocks S1031 and S1032.

At block S1031, when current broadcast data is stored in the third storage space, text data of a newly recognized text line is stored in the third storage space as at least a part of the next piece of broadcast data in a sequential broadcast mode.

This step relates to storage of broadcast data used in sequential broadcasting. The "current broadcast data" described here is broadcast data immediately before the "next piece of broadcast data".

Sequential broadcasting includes broadcasting sequentially line by line. When each text line in the text area is recognized and stored in lines, the recognized text data is stored in the first storage space to form the first text. Then, during sequential broadcasting, each piece of text data newly recognized and stored in the first text may also be stored in the third storage space, so as to be acquired by the broadcasting apparatus. Since the broadcast speed is usually slower than the character recognition speed, the text data of at least one text line can be acquired as a piece of broadcast data each time. After broadcasting of the previous piece of broadcast data is completed or is about to be completed, the broadcasting apparatus continues to acquire broadcast data from the third storage space, such that the broadcast data can be conveniently acquired in time.

According to some embodiments, text data of each newly recognized text line may be stored in the first text first, and then obtained sequentially from the first text in batches and stored in the third storage space according to situations, and each batch of text data stored in the third storage space may be used as a piece of broadcast data for broadcasting.

Whether the text data of each newly recognized text line is recognized line by line and stored in sequence, or the text data of the newly recognized text line is stored in batches, the text data of the newly recognized text line is stored in the third storage space with the progress of recognition, so as to form the next piece of broadcast data, thereby keeping the broadcast data updated in the sequential broadcast mode.

According to some embodiments, in response to performing storage in the third storage space each time, the association information for the next piece of broadcast data stored in the second storage space is constructed and/or updated.

Each time the storage is performed in the third storage space, the stored broadcast data changes. It can be known from the above that, the newly stored text data will be used as a part of the next piece of broadcast data or the entire broadcast data, such that the current broadcast data is not affected, but the next piece of broadcast data will be affected.

The broadcast status of the broadcasting apparatus is usually determined by the broadcast progress, for example, whether broadcasting of the current broadcast data is completed, when to broadcast the next piece of broadcast data, etc. Thus, for the broadcast data stored in the third storage space, if the broadcasting apparatus actively initiates the next broadcast data request and starts to prepare to acquire the next piece of broadcast data from the first text in response to the next broadcast data request, then all the recognized and not yet broadcasted text data can be stored in the third storage space as the next piece of broadcast data. In response to this, the association information for the next piece of broadcast data can be constructed without updating the association information for the next piece of broadcast data, that is, the storage of the next piece of broadcast data and the construction of the association information for the next piece of broadcast data only need to be performed once. Thus, processing resources are saved. However, this may lead to a slow broadcast speed, because it needs to wait for the instant acquisition and storage of the next piece of broadcast data, and the instant construction of the association information.

For the method in which the text data of each newly recognized text line is stored in the third storage space, it is required to continuously store the text data of each newly recognized text line before the broadcasting apparatus acquires the next piece of broadcast data. Moreover, it is also required to update the association information for the text data used as a part of the next piece of broadcast data or the entire next piece of broadcast data in response to each storage (because it is not determined when the broadcasting apparatus acquires the next piece of broadcast data). This method requires more processing resources than the former method, but can accelerate the broadcast speed, because there is no need to wait for the instant acquisition and storage of the broadcast data and the instant construction of the association information.

The construction of the association information is described with reference to FIGS. 3A, 3B, and 3C, and the update of the association information will be described below with reference to FIGS. 7A, 7B, 7C, and 7D.

Figure 5B:
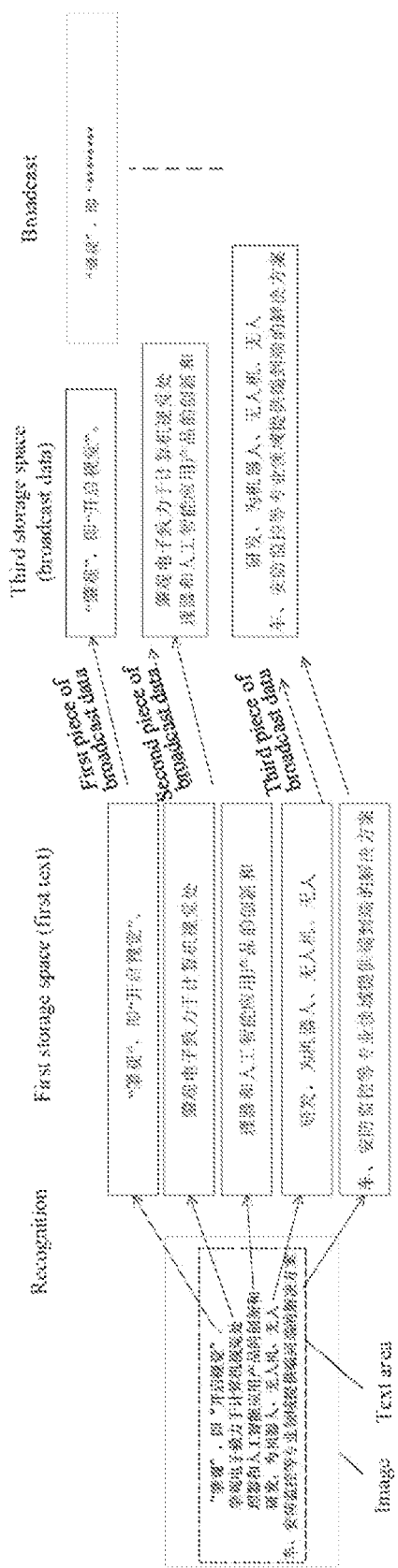
FIG. 5B illustrates an example process of sequential broadcasting according to exemplary embodiments of the present disclosure.

According to some embodiments, the text data obtained by performing character recognition on the first text line to be recognized in the text area may be taken as a piece of broadcast data separately, such that the text data of the first text line can be quickly broadcasted, thereby increasing the response speed of broadcasting and improving user experience. As illustrated in FIG. 5B, the first text line in the text area is stored as a piece of broadcast data separately.

Here, the "first text line to be recognized" may be the first line of text in the entire text area, or may not be the first line of text in the entire text area, but the first line of text to be recognized in some lines (a part of lines) of the entire text area.

The first line of recognized data is used as a piece of broadcast data separately for broadcasting, such that there is no need to wait for the recognition and storage of subsequent text lines. Thus, the broadcast waiting time is greatly reduced, the broadcast speed is effectively increased, and the broadcast speed of the first line of text of interest is helpful to show the performance of the broadcasting apparatus.

Figure 6:
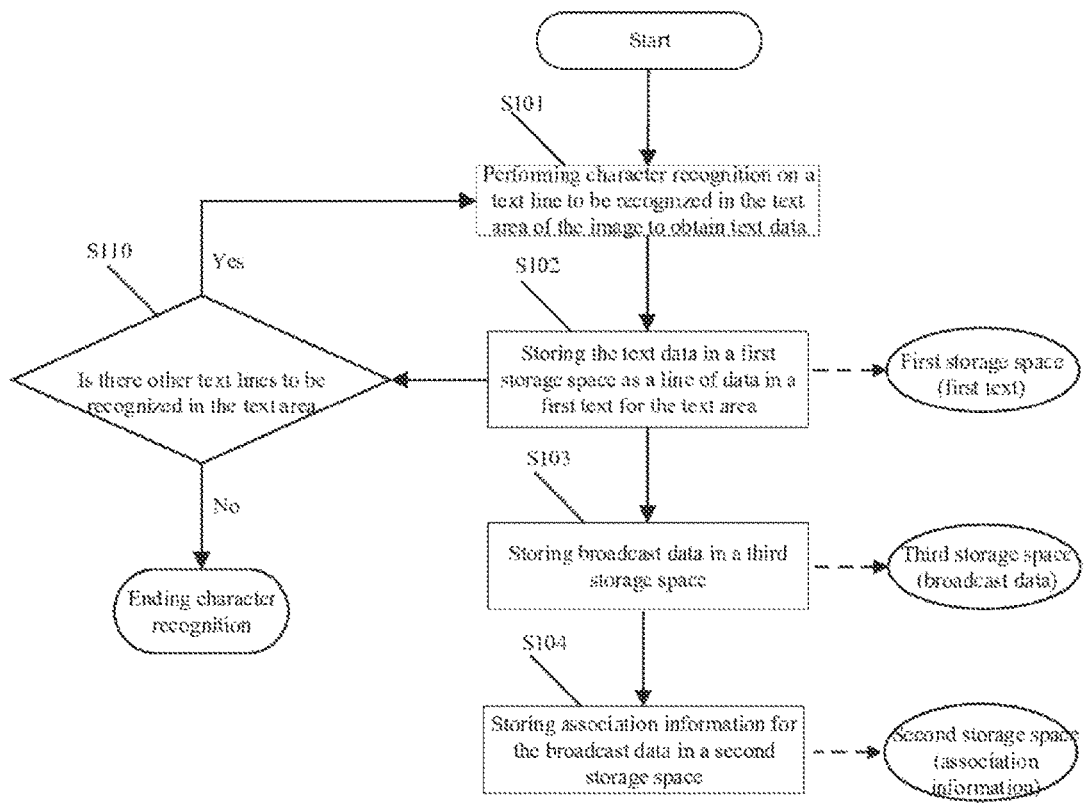
FIG. 6 is a flowchart illustrating an image text broadcasting method according to another exemplary embodiment of the present disclosure.

According to some embodiments, as illustrated in FIG. 6, the image text broadcasting method according to the present disclosure may further include: determining whether there is a next text line to be recognized in the text area (at block S110), if yes, block S101 is performed, and the character recognition operation at block S101 is performed on the next text line to be recognized, the operation at block S102 may continue to be performed in sequence, until text lines to be recognized in the text area are all recognized and stored in the first storage space. If there is no next text line to be recognized, the character recognition for the text area may be ended.

Block S110 may be performed after block S102, or may be performed after block S103 or block S104. In the present disclosure, there is no limitation on the execution order of the steps, as long as the required functions can be completed.

For ease of understanding, FIG. 5B illustrates an example process of recognizing, storing, and broadcasting in sequence.

In the present disclosure, as an example, the current stored text data can be broadcasted in its stored order while the text data is recognized and stored in sequence, such that the text in the text area can be sequentially broadcasted. For example, when the text in the text area is arranged by line, each line of current stored text data can be broadcasted in the stored order while the text data is detected and recognized in lines, and each line of recognized text data is stored in sequence.

For brevity, in FIG. 5B, different from FIG. 2, it is assumed that the text area has only 5 text lines. The 5 text lines are recognized line by line, and obtained text data is stored in the first storage space in lines to form each line of data in the first text in sequence. Moreover, the broadcast data (three pieces of broadcast data are illustrated in FIG. 5B) is stored in the third storage space for sequential broadcasting. FIG. 5B does not illustrate the second storage space and the association information stored therein, because the second storage space and the association information stored therein are used for establishing the association relationship of the positional correspondence between the first storage space and the third storage space, and are not directly used for broadcasting.

In the following, exemplarily details will be described with reference to FIG. 5B. For example, for the text area illustrated in FIG. 5B, after the first text line is recognized, and the text data of the recognized text line is stored as the first piece of broadcast data, the first piece of broadcast data may be immediately broadcasted, so as to shorten the broadcast waiting time and increase the broadcast speed. In addition, after the first text line is recognized and stored, that is, while the text data of the first text line is being broadcasted, the subsequent text lines can be recognized and stored, thereby achieving the beneficial technical effect in which broadcasting is performed while recognition and storage are performed.

After broadcasting of the text data of the first text line is completed, the second piece of broadcast data may continue to be broadcasted. It is assumed that the second line of text and the third line of text are recognized and stored in the process of broadcasting the text data of the first text line, the second piece of broadcast data includes the second line of text and the third line of text. Thus, the broadcasting of the second piece of broadcast data has semantic cohesion and context, which overcomes rigid and mechanical gaps or pauses occurred during the word-by-word or line-by-line broadcast in the related art.

In addition, in the process of broadcasting the second piece of broadcast data, recognition and storage operations may be performed on subsequent text lines, thereby achieving the beneficial technical effect in which broadcasting is performed while recognition and storage are performed.

After the second piece of broadcast data is broadcasted, the third piece of broadcast data (for example, including the fourth line of text and the fifth line of text) can continue to be broadcasted. The cycle is repeated until broadcasting of text lines of the entire text area is completed, and the sequential broadcasting process of the text area is completed.

In the present disclosure, the text data is spliced and stored to facilitate multi-line broadcast. In the case that the recognition and storage speed is faster than the broadcast speed, during broadcasting of one line, multiple lines may have been recognized and stored. Thus, by broadcasting while recognizing and storing, there is sufficient stored text data for the broadcasting apparatus to use, and there is no need to wait for all text lines to be recognized and stored before broadcasting, such that the broadcast waiting time can be greatly reduced, the broadcast speed and efficiency can be improved, and coherent and fluent broadcasting can be implemented. The method and device according to the present disclosure can help, for example, visually impaired users, young or elderly users, dyslexic users, etc. easily understand, for example, information automatically broadcasted by a reading assisting device from the text area.

It should be noted that although all three pieces of broadcast data are illustrated in FIG. 5B, as described above, each piece of broadcast data may be removed or covered, or retained for a relatively long time after being broadcasted.

In the present disclosure, by storing batches of text data (at least one line of data) in the third storage space as broadcast data, problems such as lack of semantic cohesion, incoherence, and excessive pauses caused by word-by-word or line-by-line broadcast in the related art can be overcome. Batches of broadcast data (at least one line of text data is spliced) can make semantic cohesion, coherent and fluent broadcasting, pauses can be reduced, and broadcast effect can be improved.

With reference to FIGS. 7A, 7B, 7C, and 7D, the establishment, storage, and update of the corresponding association information to be stored in the second storage space when the text data of text lines recognized line by line is stored in the third storage space in sequence will be described with specific examples. For the case of batch storage in the third storage space, the corresponding association information can be calculated at one time without multiple updates, which is relatively simpler in calculation and processing. Thus, more details about calculation of association information in the case of batch storage in the third storage space will not be illustrated separately.

As described above, the association information is stored in the second storage space, and furthermore, the corresponding data corresponding to the broadcast data may be (but not necessarily) stored in the second storage space. For ease of description and understanding, in this example, the broadcast data is the same as the corresponding data. For intuitive understanding, the calculation and update of the cut-off proportion are described below for the broadcast data (although the broadcast data is not necessarily stored in lines, since the broadcast data here is the same as the corresponding data, it may be considered that a line of data in the corresponding data is "a line of data" in the broadcast data). In addition, for ease of description and easy understanding, FIGS. 7A, 7B, 7C, and 7D illustrate respective text data (which constitutes a part or all of the corresponding data), so as to be viewed in comparison with association information. However, as mentioned above, the text data are not necessarily stored in the second storage space, and thus the dashed box is used to indicate that the it is not required.

By the way, according to some embodiments, association information such as the position and cut-off proportion may also be stored in the first storage space, so as to facilitate information collection and management. It should be noted that, the association information related to the first text stored in the first storage space is not necessarily the same as the association information stored in the second storage space, because the association information in the second storage space is often calculated for part of data in the first text. If the association information is stored in the first storage space, the association information often needs to be calculated based on the first text, which is gradually recognized for the entire text area and finally composed of text data of all text lines (alternatively, the association information for the entire first text may be calculated and updated in real time with the recognition of text lines, and finally obtained). Certainly, it is possible that the association information is not stored in the first storage space.

In this example, although operations related to the association information in the second storage space are mainly discussed, the corresponding operations in the first and third storage spaces will also be described when necessary.

Figure 7A:
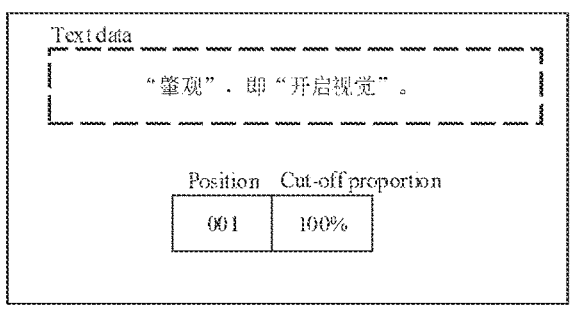
FIGS. 7A, 7B, 7C, and 7D illustrate processes of storing broadcast data and determining association information according to exemplary embodiments of the present disclosure.
Figure 7A:
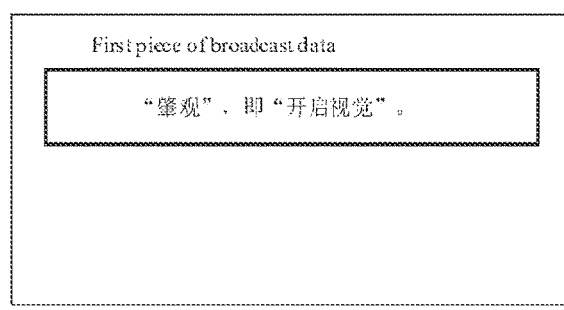

In the example provided here, the first line of text in the text area is recognized and stored in the first storage space (not illustrated), and separately stored in the third storage space as a piece of broadcast data (the first piece of broadcast data) for broadcasting, for example, during sequential broadcasting (that is, there is no need to wait for splicing and storage with other lines of words), as illustrated in FIG. 7A.

In addition, the text data (not required) obtained by recognizing the first line of text in the text area and the association information including the position (the line number in this example) and the cut-off proportion are stored in the second storage space. For example, the stored information is as follows:

["肇观"，即"开启视觉"。] (Chinese characters, which mean ["NextVPU", i.e., "Next Vision Processing Unit".]), [001], and [100%].

As described above, for the newly recognized text line, its cut-off proportion can be directly determined as 100%, in other words, its cut-off proportion can be directly determined without calculation.

As described above, the text data of the line may be stored as a piece of broadcast data separately, which can improve the response speed of broadcasting. Certainly, it may also be stored as a piece of broadcast data with text data of subsequent text lines.

In this case, broadcasting of the first piece of broadcast data may start.

Figure 7B:
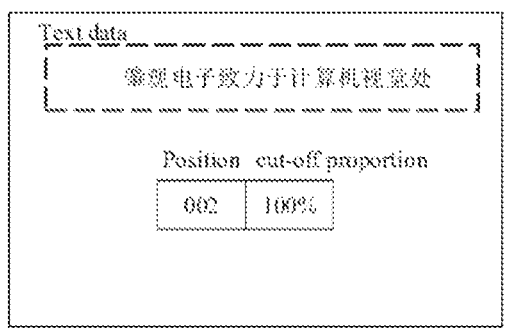
Figure 7B:
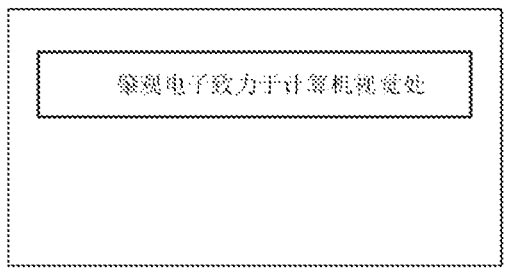

Then, during broadcasting of the first piece of broadcast data, it may be determined whether there is the next text line to be recognized (at block S110). When it is determined that there is the next text line to be recognized (for example, the second text line), the process proceeds to block S101 to continue to recognize the second line of text, as illustrated in FIG. 7B, the recognized text data and its association information are stored in the first storage space, the second storage space, and the third storage space, respectively. In this case, the text data and the association information of the second line of text stored in the second storage space may be:

[肇观电子致力于计算机视觉处] (Chinese characters, which mean [NextVPU is dedicated to offering computer vision]), [002], and [100%].

Since the first piece of broadcast data corresponding to the first line of text is being broadcasted, the second piece of broadcast data is being prepared, and it includes the text data of the second line of text.

Then, it is determined whether there is the next text line to be recognized at block S110. When it is determined that there is the next text line to be recognized (for example, the third text line), the process proceeds to block S101 to continue to recognize the third line of text, and the recognized text data and its association information are stored in the first storage space, the second storage space, and the third storage space, respectively.

Since the first piece of broadcast data corresponding to the first line of text is being broadcasted, the second piece of broadcast data is still being prepared. In this case, the second piece of broadcast data includes text data of the second text line and the third text line, and their cut-off proportions stored in the second storage space need to be updated. In this case, a cut-off proportion of text data whose position in the text area is the second line in the second piece of broadcast data is updated from the previous 100% to "the number of characters in the second line of text/(the number of characters in the second line of text+the number of characters in the third line of text)", that is, 26/56=46%, and the cut-off proportion of the third line of text is 100%.

Figure 7C:
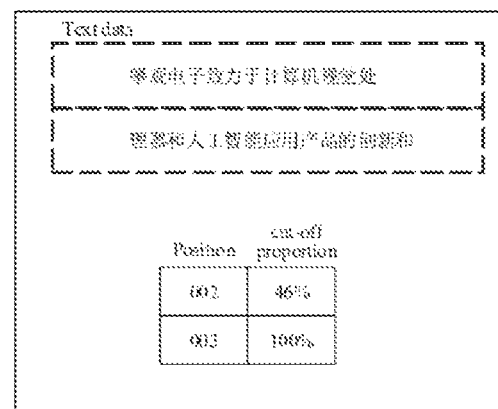
Figure 7C:
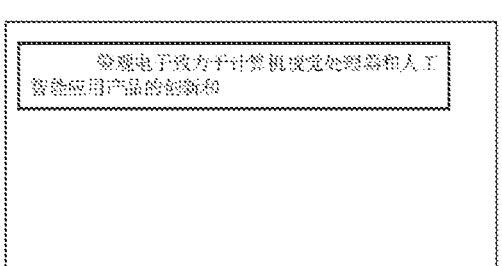

In this case, as illustrated in FIG. 7C, text data and association information for the next piece of broadcast data stored in the second storage space are as follows:

[肇观电子致力于计算机视觉处] (Chinese characters, which mean [NextVPU is dedicated to offering computer vision]), [002], and [46%]
[理器和人工智能应用产品的创新和] (Chinese characters, which mean [innovation of processor and AI application products]), [003], and [100%].

Then, it is determined whether there is the next text line to be recognized at block S106. When it is determined that there is the next text line to be recognized such as the fourth text line, the process proceeds to block S101 to continue to recognize the fourth line of text, and the recognized text data and its association information are stored in the first, the second, and the third storage space, respectively.

Then, the association information for the next piece of broadcast data in the second storage space is updated. Firstly, the total number of characters in the next piece of broadcast data and the corresponding cut-off proportion are calculated, that is, the number of characters in the second line of text, the third line of text, and the fourth line of text in the text area: 26+30+25=81. In this case, the cut-off proportion of the second line of text may be updated to (the number of characters in the second line of text/the total number of characters in the next piece of broadcast data), i.e., 26/81=32%, the cut-off proportion of the third line of text may be updated to ((the number of characters in the second line of text+the number of characters in the third line of text)/the total number of characters in the next piece of broadcast data), i.e., (26+30)/81=69%, and the cut-off proportion of the newly recognized fourth line of text may be directly determined as 100%.

Figure 7D:
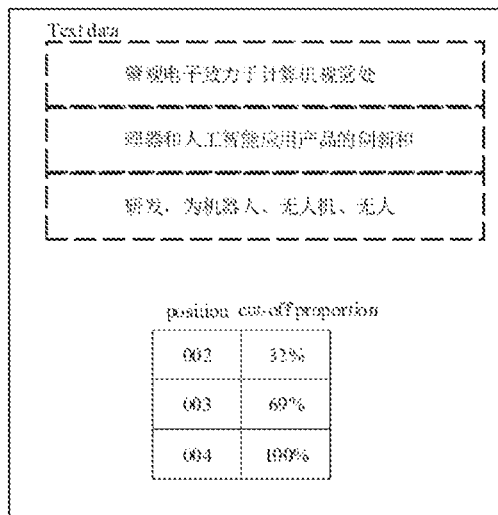
Figure 7D:
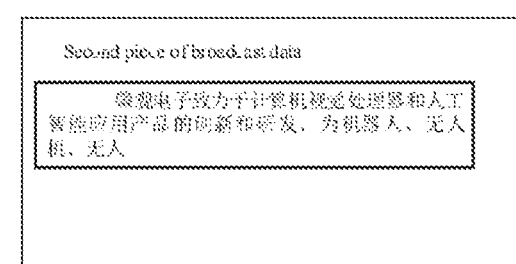

In this case, as illustrated in FIG. 7D, text data and association information for the next piece of broadcast data stored in the second storage space are as follows:

[肇观电子致力于计算机视觉处] (Chinese characters, which mean [NextVPU is dedicated to offering computer vision]), [002], and [32%]
[理器和人工智能应用产品的创新和] (Chinese characters, which mean [innovation of processor and AI application products), [003], and [69%]
[研发、为机器人、无人机、无人] (Chinese characters, which mean [development, for robots, UAV, unmanned]), [004], and [100%].

second, the third, and the fourth lines of texts may be taken as the second piece of broadcast data for broadcasting (sequential broadcasting).

In the process of broadcasting the second piece of broadcast data in sequence, it is determined whether there is the next text line to be recognized. When it is determined that there is the next text line to be recognized such as the fifth text line, the next piece of broadcast data (the third piece of broadcast data) is prepared.

In the above, "in response to performing storage in the third storage space each time, constructing and/or updating association information for the next piece of broadcast data stored in the second storage space" is described in detail with actual examples.

For the case where the text data is stored in the third storage space in batches as the next piece of broadcast data, the association information for the next piece of broadcast data only needs to be calculated once and stored in the second storage space. The calculation method is similar to that related to FIGS. 3A to 3C and FIGS. 7C and 7D, which is not repeatedly described here.

In addition, with regard to calculation and update of the cut-off proportion, the cut-off proportion of the next piece of broadcast data can be calculated in real time in response to the broadcasting apparatus initiating acquisition of the next piece of broadcast data, such that the cut-off proportion only needs to be calculated once, and does not need to be updated each time text data of the text line is stored.

The reason why the association information is also calculated and/or updated during sequential broadcasting is that, the specified broadcast operation initiated by the user is often unpredictable, and may occur at any time during sequential broadcasting or during specified broadcasting. Thus, in each broadcasting, the required association information can be prepared for recognizing the current broadcast position.

The exemplary cases in which the image include a text area is described above. For the cases in which the image includes multiple text areas, the above recognition and storage operations can be performed for each text area, until all text lines or text lines of interest in the text area are recognized and stored.

According to some embodiments, when the image includes multiple text areas, the text data of multiple text areas may be stored together, or may be stored separately, which is not limited thereto in the present disclosure.

By providing the second storage space, and by establishing the positional correspondence between broadcast data in the third storage space and corresponding data in the first storage space using the association information for broadcast data in the second storage space, in the present disclosure, when recognition and storage of characters are performed in parallel with broadcasting, specified broadcasting such as TTS broadcasting can be supported. There is no need to wait for all text lines to be recognized and stored before broadcasting as in the related art. Instead, broadcasting is performed while recognition and storage are performed. The broadcasting does not affect the recognition and storage of text data, which can improve the broadcast speed, and achieve efficient and fast broadcasting. In addition, by supporting specified broadcasting without re-recognizing and re-storing the text, processing time and processing resources can be greatly reduced, and the broadcast speed can be increased (without re-recognition).

According to some embodiments, as illustrated in FIG. 5A, at block S1032, the next piece of broadcast data is acquired from the first text in response to receiving the specified broadcast indication (the combination of blocks S2 and S3).

This step relates to broadcast data used in sequential broadcasting. As described above, the user (for example, the visually impaired user and the hearing-impaired user) may need to rehear some of previous content in the broadcasting process. In the present disclosure, such function can be supported. As described above, this function is referred to as the "specified broadcasting" function in the present disclosure. Here, the specified broadcasting may include forward and backward broadcasting, and may further include broadcasting at the position specified by the user.

As mentioned above, in the case of receiving the specified broadcast indication, it is required to prepare the corresponding broadcast data (which may also be referred to as "specified broadcast data") for the specified broadcasting. Thus, in this step, the broadcast data (the specified broadcast data) can be acquired from the first text in response to receiving the specified broadcast indication.

As described above, each line of data in the first text corresponds to each text line in the text area. With the progress of character recognition and storage, the first text may include the text data of the entire text area finally. Thus, both the sequential broadcast data and the specified broadcast data for the text area can be obtained from the first text. Certainly, as mentioned above, in sequential broadcasting, the newly recognized text data may be directly stored in the third storage space, instead of being acquired from the first text.

By means of this step, the specified broadcast functions such as TTS broadcasting can be implemented.

According to some embodiments, the current broadcast progress may be determined by the proportion of the number of characters that have been broadcasted to the number of characters of the broadcast data.

For example, the broadcast data including three lines of data illustrated in FIG. 3B has 81 characters. It is assumed that the characters "人工智能 (Chinese characters, which mean AI)" have been broadcasted, in this case, the number of characters that have been broadcasted is 40, then it can be determined that the current broadcast progress is 40/81=49%.

In addition, the current broadcast progress may also be determined with other parameters, and the present disclosure is not limited to calculating the current broadcast progress with the number of characters.

Figure 8:
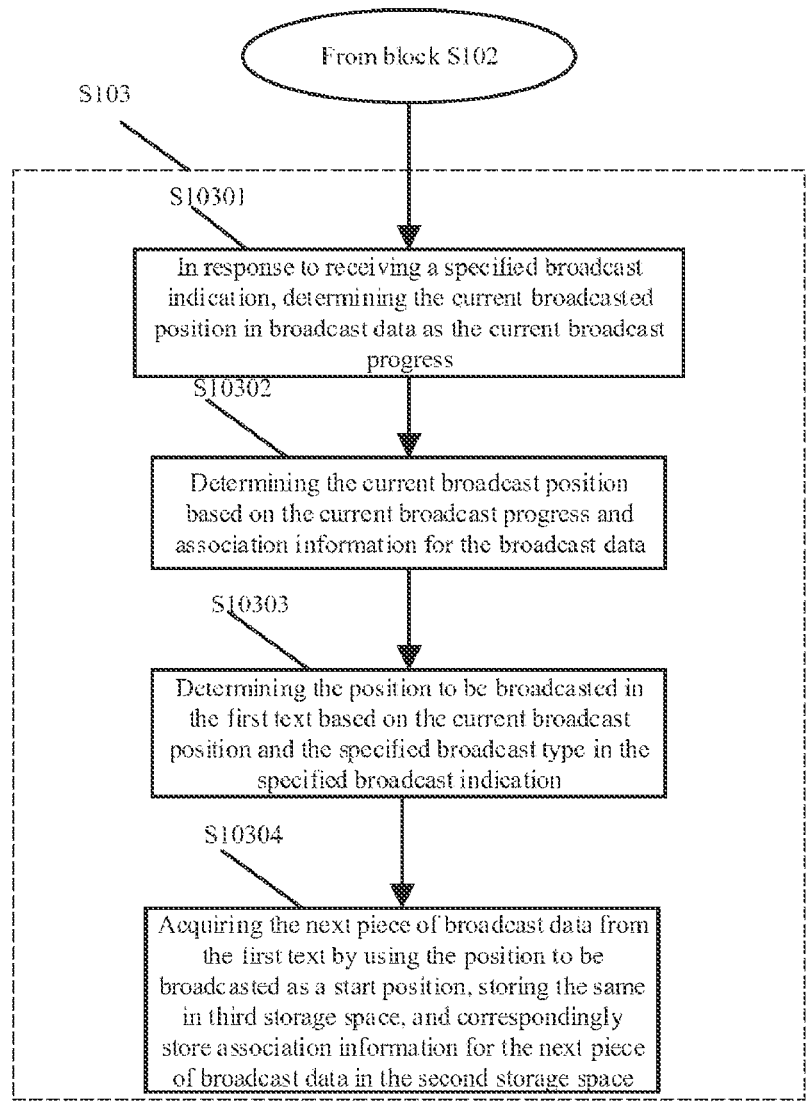
FIG. 8 is a flowchart of preparing specified broadcast data according to exemplary embodiments of the present disclosure.

According to some embodiments, acquiring the broadcast data from the first text in response to receiving the specified broadcast indication may include blocks S10301-S10304, as illustrated in FIG. 8.

At block S10301, the current broadcasted position in the broadcast data is determined as the current broadcast progress in response to receiving the specified broadcast indication.

As described above, the user (for example, the visually impaired user and the hearing-impaired user) may need to rehear previous content in the broadcasting process, for example, rehearing the previous paragraph or the previous line of the current broadcast position.

The specified broadcast indication is usually received in the broadcasting process. When the specified broadcast indication is received, the current broadcast progress may be determined based on the current broadcasted position in the broadcast data.

At block S10302, the position in the first text that corresponds to the current broadcast progress is determined as the current broadcast position based on the current broadcast progress and association information for the broadcast data in the second storage space.

After the current broadcast progress is determined, the position (that is, the current broadcast position) in the first text that corresponds to the current broadcast progress needs to be determined. In this case, the current broadcast position may be acquired based on the obtained current broadcast progress and the association information for the broadcast data in the second storage space, for example, the position of each line of data in the broadcast data in the first text and the cut-off proportion of the line of data, as illustrated in FIG. 3B.

According to dome embodiments, determining the position in the first text that corresponds to the current broadcast progress as the current broadcast position based on the current broadcast progress and association information for the current broadcast data in the second storage space at block S10302 may include: comparing the current broadcast progress with the cut-off proportion for the current broadcast data stored in the second storage space, and determining the position of the current broadcast data stored in the second storage space and corresponding to a minimum cut-off proportion in the cut-off proportion greater than the current broadcast progress, as the current broadcast position.

For example, the current broadcast progress can be compared with the cut-off proportion of the broadcast data stored in the second storage space. For example, the obtained current broadcast progress is 49%, and the cut-off proportion of each line of data in the association information about the broadcast data stored in the second storage space are respectively: 32%, 69%, and 100%. In this case, it can be determined that the current broadcasted data "人工智能 (Chinese characters, which mean AI)" should be in the position, in the first text, of the line of data with the cut-off proportion of 69% (the minimum cut-off proportion in the cut-off proportion greater than the current broadcast progress). By searching the association information, it can be found that the line of data with the cut-off proportion of 69% is the third line of the first text, and it can be determined that the current broadcast position is the third line of the text area corresponding to the first text.

Figure 9:
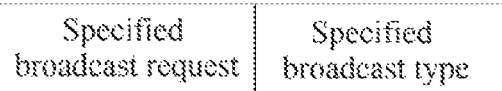
FIG. 9 is a schematic diagram illustrating an exemplary form of a specified broadcast indication according to exemplary embodiments of the present disclosure.

According to some embodiments, the specified broadcast indication may include the specified broadcast request and the specified broadcast type, as illustrated in FIG. 9.

According to some embodiments, the specified broadcast type may include specified broadcasting of the previous line, specified broadcasting of the following line, specified broadcasting of the previous paragraph, and specified broadcasting of the following paragraph, may even include specified broadcasting of the previous sentence and specified broadcasting of the following sentence, and may even include specified broadcasting of a certain segment.

Since only the current broadcast position is obtained at block S10302, when it is required to prepare broadcast data for specified broadcasting, the start position of the specified broadcasting, i.e., the position to be broadcasted, needs to be known.

At block S10303, the position to be broadcasted in the first text is determined based on the current broadcast position and the specified broadcast type in the specified broadcast indication.

In this step, by means of the relationship, determined by the specified broadcast type, between the current broadcast position and the position to be broadcasted, the position to be broadcasted is obtained based on the current broadcast position. For example, when the specified broadcast type is broadcasting the previous line, the relationship between the current broadcast position and the position to be broadcasted is: the position to be broadcasted=the current broadcast position−1. For another example, when the specified broadcast type is broadcasting the following line, the relationship between the current broadcast position and the position to be broadcasted is: the position to be broadcasted=the current broadcast position+1. Details will be described below through examples.

At block S10304, the position to be broadcasted is used as the start position, the next piece of broadcast data is acquired from the first text and stored in the third storage space, and association information for the next piece of broadcast data is correspondingly stored in the second storage space.

After the position of the current broadcast data in the first text (that is, the position to be broadcasted) is obtained, the broadcast data starting from the position to be broadcasted (that is, the next piece of broadcast data) can be prepared for the specified broadcasting. The next piece of broadcast data may include several lines of data starting from the position to be broadcasted to the last line of the first text, or starting from the position to be broadcasted in this paragraph to the last line in this paragraph, or starting from the position to be broadcasted and with lines less than a threshold number of lines in the first text. For example, when the threshold number of lines is 4, three lines of data may be prepared, and the three lines of data is three lines of data starting from the line where the position to be broadcasted is positioned. Assuming that the position to be broadcasted is the second line, and the threshold number of lines is 4, it can be determined that the next piece of broadcast data to be prepared is three lines of data starting from the second line, that is, the second line, the third line, and the fourth line of data in the first text.

After the next piece of broadcast data is acquired from the first text, it may be stored in the third storage space to replace the previous broadcast data for broadcasting, thereby supporting specified broadcasting. In addition, the next piece of broadcast data may also be stored in the second storage space to replace the previous broadcast data, as illustrated in FIG. 3C, so as to facilitate acquisition of accurate information of the current broadcast data.

Moreover, association information for the next piece of broadcast data (i.e., the position and the cut-off proportion information for the next piece of broadcast data) needs to be calculated and stored in the second storage space, as illustrated in FIG. 3B. The newly stored association information of the next piece of broadcast data may replace the association information of the previous broadcast data, or may be stored in the second storage space in the incremental manner. When it is stored in the incremental manner, the status of the association information of the previous broadcast data needs to be changed. As an example, the status of the association information may be determined by setting a status identifier. For example, the status identifier "00" may be used to indicate that the status of the broadcast data in the third storage space that corresponds to the association information is "to-be-broadcast status", the status identifier "01" may indicate that the status is "being broadcast", the status identifier "10" may indicate that the status is "broadcasted", and the like. Thus, it is convenient to recognize the required association information through the status identifier.

Thus, by means of the above step, the present disclosure can support the specified broadcast function such as TTS broadcasting, which is meaningful especially for the visually impaired or hearing-impaired persons, reading experience of users can be improved.

According to some embodiments, the specified broadcast type in the specified broadcast indication may include broadcasting an adjacent text unit.

The adjacent text unit is adjacent to the text unit where the current text line is positioned.

Here, a text unit may be a text line or a text paragraph, or may be several text lines or several text paragraphs. Thus, in the present disclosure, the supported specified broadcasting operation may include broadcasting the text unit adjacent to the text unit where the current text line is positioned. Thus, the adjacent text unit may be a line or a paragraph, or may be several lines or several paragraphs. The present disclosure can support specified broadcasting for text units.

The adjacent text unit may include several lines immediately before the current broadcast text line, several lines immediately after the current broadcast text line, several paragraphs immediately before the paragraph where the current broadcast text line is positioned, or several paragraphs immediately after the paragraph where the current broadcast text line is positioned.

Figure 10:
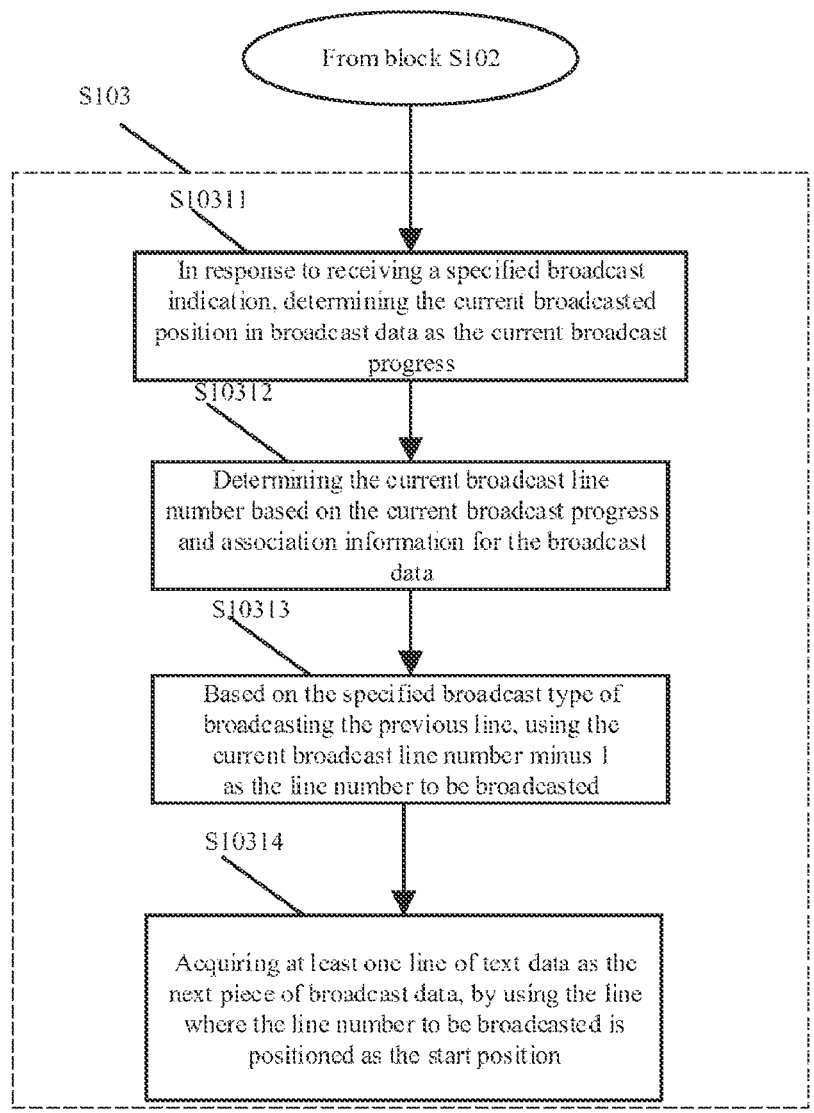
FIG. 10 is a flowchart of preparing specified broadcast data in response to a specified broadcast indication according to exemplary embodiments of the present disclosure.

According to some embodiments, in the case that broadcasting the adjacent text unit includes broadcasting the previous line, and the position, in the first text, of each line of data in the broadcast data stored in the second storage space includes the line number of the text line corresponding to the line of data, as illustrated in FIG. 10, block S103 of acquiring the next piece of broadcast data from the first text in response to receiving the specified broadcast indication (corresponding to block S1032 at block S103) may include the following operations.

At block S10311, the current broadcasted position in the broadcast data is determined as the current broadcast progress in response to receiving the specified broadcast indication.

This step is similar to the above-mentioned step S10301, which is not repeatedly described here.

At block S10312, the line number of the text line in the first text that corresponds to the line of data corresponding to the current broadcast progress in the current broadcast data is determined as the current broadcast line number, based on the current broadcast progress and the association information for the current broadcast data stored in the second storage space.

This step is used to determine the current broadcast line number taken as the current broadcast position. Similar to block S10302, the current broadcast line number can be determined based on the current broadcast progress and the line number in the association information recorded in the second storage space (as described above, the position in the association information include the line number).

At block S10313, based on the specified broadcast type of broadcasting the previous line, the current broadcast line number minus 1 is used as the line number to be broadcasted.

Since the specified broadcast type in the specified broadcast indication is broadcasting the previous line, the current broadcast line number minus 1 can be determined as the line number to be broadcasted.

At block S10314, at least one line of text data is acquired as the next piece of broadcast data, by using the line where the line number to be broadcasted is positioned as the start position.

Details will be described below by way of examples. Assuming that the specified broadcast type in the specified broadcast indication is broadcasting the previous line, when the current broadcast line number used as the current broadcast position is the third line in the first text (that is, the third text line in the text area), the start position of the specified broadcasting should be the second line of the first text, and several lines of data starting from the second line may be acquired as the next piece of broadcast data. The specific number of lines of data that can be included in the next piece of broadcast data has been described in detail above, which is not repeatedly described here.

By means of the above steps S10311 to S10314, the present disclosure can support specified broadcasting of the previous line, which can overcome the defect that broadcasting such as TTS broadcasting in the related art cannot support forward and backward broadcasting.

Figure 11:
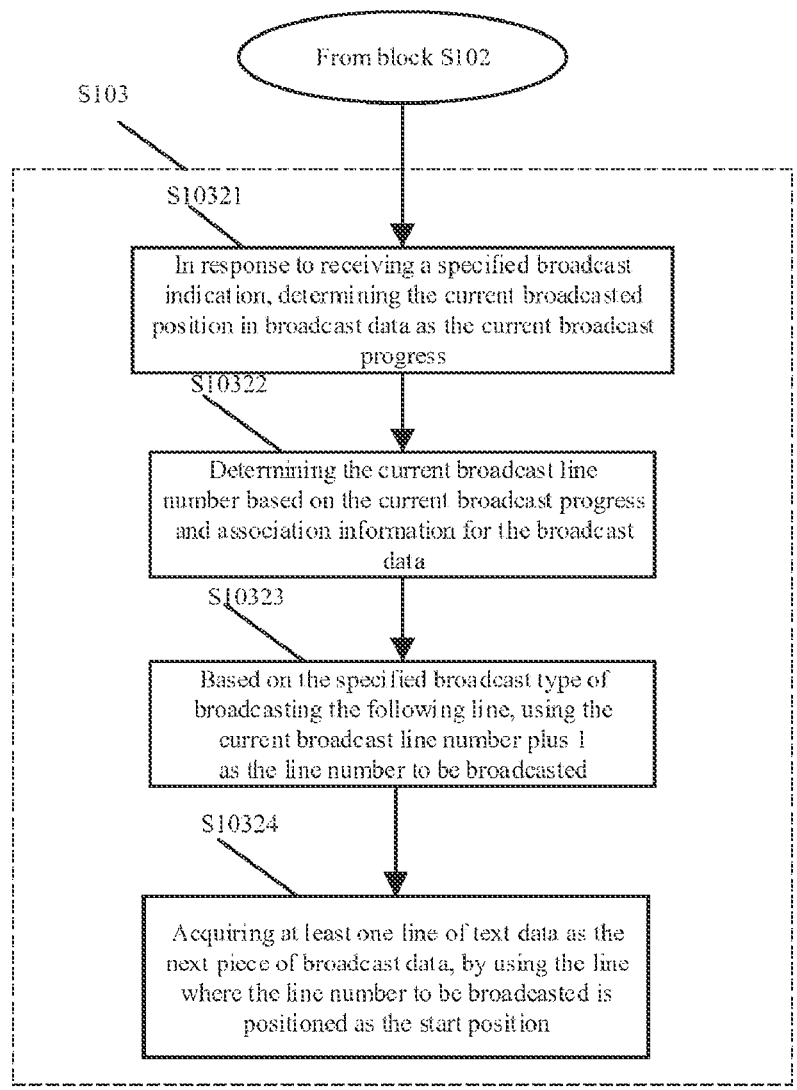
FIG. 11 is a flowchart of preparing specified broadcast data in response to a specified broadcast indication according to exemplary embodiments of the present disclosure.

According to some embodiments, in the case that broadcasting the adjacent text unit includes broadcasting the following line, and the position, in the first text, of each line of data in the broadcast data stored in the second storage space includes the line number of the line of data, as illustrated in FIG. 11, block S103 of acquiring the next piece of broadcast data from the first text in response to receiving the specified broadcast indication (corresponding to block S1032 at block S103) may include the following operations.

At block S10321, the current broadcast position in the broadcast data is determined as the current broadcast progress in response to receiving the specified broadcast indication.

At block S10322, the line number of the text line in the first text that corresponds to the line of data corresponding to the current broadcast progress in the current broadcast data is determined as the current broadcast line number, based on the current broadcast progress and the association information for the current broadcast data stored in the second storage space.

At block S10323, based on the specified broadcast type of broadcasting the following line, the current broadcast line number plus 1 is used as the line number to be broadcasted.

At block S10324, at least one line of text data is acquired as the next piece of broadcast data, by using the line where the line number to be broadcasted is positioned as the start position.

Blocks S10321 to S10324 are similar to the above-mentioned blocks S10311 to S10314, which are not repeatedly described here.

Details will be described below by way of examples. Assuming that the specified broadcast type in the specified broadcast indication is broadcasting the following line, when the current broadcast line number used as the current broadcast position is the third line in the first text (that is, the third text line in the text area), the start position of the specified broadcasting should be the fourth line of the first text, and several lines of data starting from the fourth line may be acquired as the next piece of broadcast data.

By means of the above steps S10321 to S10324, the present disclosure can support specified broadcasting of the following line, which can overcome the defect that broadcasting such as TTS broadcasting in the related art cannot support forward and backward broadcasting.

Here, in the case that specified broadcasting of paragraphs is not involved, it is not necessary to consider whether each line of data in the broadcasting is in the same paragraph, so as to maintain the coherence and fluency of the broadcasting when the next piece of broadcast data is being prepared. Certainly, the amount or length of the next piece of broadcast data may also be prepared according to actual demands, which is not limited in the present disclosure.

Figure 12:
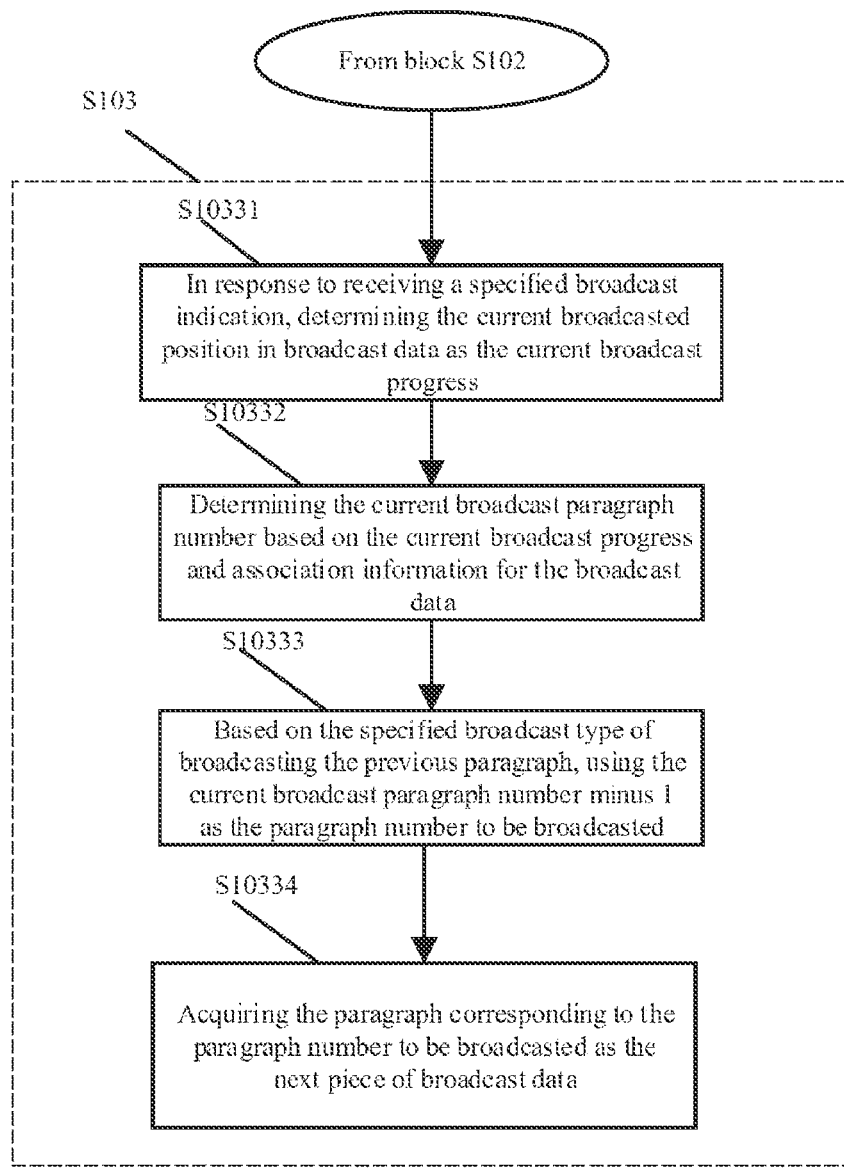
FIG. 12 is a flowchart of preparing specified broadcast data in response to a specified broadcast indication according to exemplary embodiments of the present disclosure.

According to some embodiments, in the case that broadcasting the adjacent text unit includes broadcasting the previous paragraph, and the position, in the first text, of each line of data in the broadcast data stored in the second storage space includes the paragraph number of the line of data, as illustrated in FIG. 12, block S103 of acquiring the next piece of broadcast data from the first text in response to receiving the specified broadcast indication (corresponding to block S1032 at block S103) may include blocks S10331 to S10334.

Here, characters such as "[00*]" may be used to represent the paragraph number. For example, "[001]" may represent the first paragraph in the text area. Alternatively, the paragraph number may also be represented in other manners, such as "#00*". When both the line number and the paragraph number are included, "00*00*" may be used to represent "paragraph number+line number", that is, the former "00*" is the paragraph number, and the latter "00*" is the line number. The present disclosure is not limited to this way of using special characters to represent the paragraph number, the paragraph number may also be represented in other manners, and the line number are similar. As long as the line number and paragraph number can be distinguished, and will not be confused.

According to some embodiments, in addition to the line number or the paragraph number alone, the information related to position in the association information may also include both the line number and the paragraph number information, as long as the line number information and the paragraph number information can be distinguished. Thereby, specified broadcasting can be facilitated.

At block S10331, the current broadcasted position in the broadcast data is determined as the current broadcast progress in response to receiving the specified broadcast indication.

This step is similar to the above-mentioned step S10301, which is not repeatedly described here.

At block S10332, the paragraph number of the text line in the first text that corresponds to the line of data corresponding to the current broadcast progress in the current broadcast data is determined as the current broadcast paragraph number, based on the current broadcast progress and the association information for the current broadcast data stored in the second storage space.

For example, when the third text line corresponding to the current broadcast progress is the second paragraph in the text area, it can be determined that the current broadcast paragraph number is the second paragraph.

At block S10333, based on the specified broadcast type of broadcasting the previous paragraph, the current broadcast paragraph number minus 1 is used as the paragraph number to be broadcasted.

For example, when the current broadcast paragraph number is the second paragraph, the paragraph number to be broadcasted is the first paragraph.

At block S10334, the paragraph corresponding to the paragraph number to be broadcasted is acquired from the first text as the next piece of broadcast data.

For example, when the paragraph number to be broadcasted is the first paragraph, the first paragraph is acquired from the first text as the next piece of broadcast data.

Certainly, some text data after the first paragraph may also be used as the next piece of broadcast data together with the first paragraph.

By means of the above steps S10331 to S10334, the present disclosure can support specified broadcasting of the previous paragraph, which can overcome the defect that broadcasting such as TTS broadcasting in the related art cannot support forward and backward broadcasting.

Figure 13:
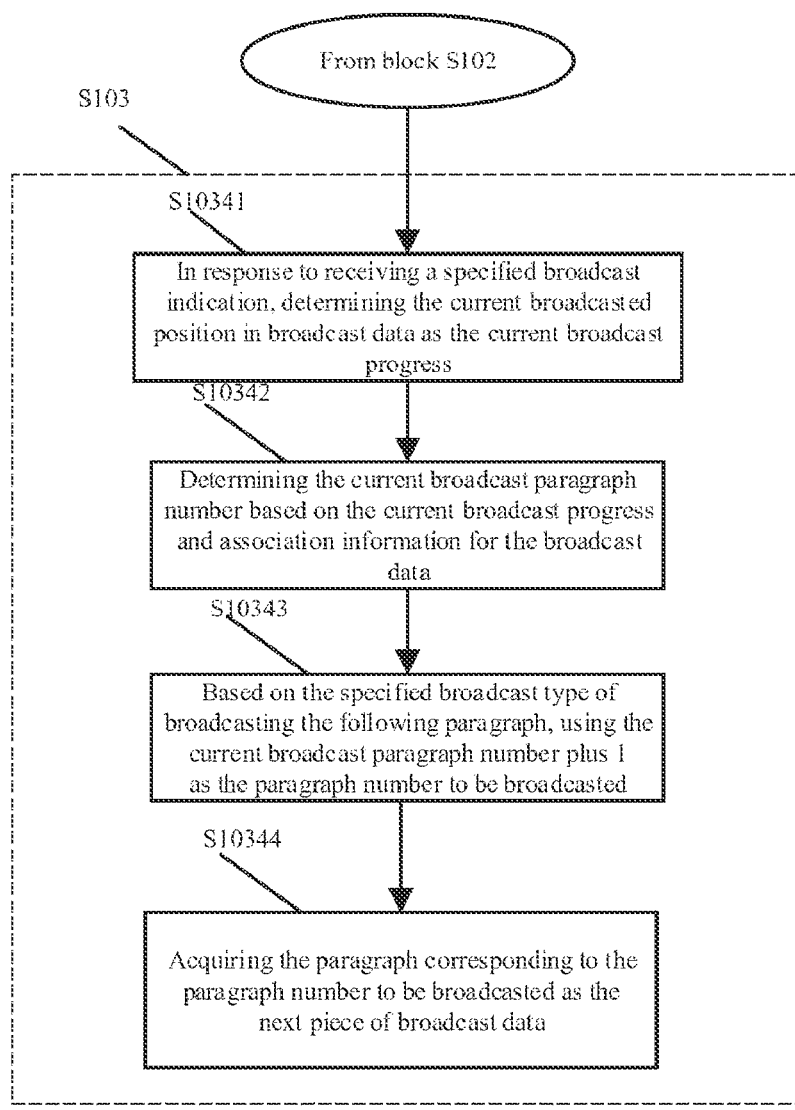
FIG. 13 is a flowchart of preparing specified broadcast data in response to a specified broadcast indication according to exemplary embodiments of the present disclosure.

According to some embodiments, in the case that broadcasting the adjacent text unit includes broadcasting the following paragraph, and the position, in the first text, of each line of data in the broadcast data stored in the second storage space includes the paragraph number of the line of data, as illustrated in FIG. 13, block S103 of acquiring the next piece of broadcast data from the first text in response to receiving the specified broadcast indication (corresponding to block S1032 at block S103) may include the following operations.

At block S10341, the current broadcast position in the broadcast data is determined as the current broadcast progress in response to receiving the specified broadcast indication.

At block S10342, the paragraph number of the text line in the first text that corresponds to the line of data corresponding to the current broadcast progress in the current broadcast data is determined as the current broadcast paragraph number, based on the current broadcast progress and the association information for the current broadcast data stored in the second storage space.

At block S10343, based on the specified broadcast type of broadcasting the following paragraph, the current broadcast paragraph number plus 1 is used as the paragraph number to be broadcasted.

At block S10344, the paragraph corresponding to the paragraph number to be broadcasted is acquired from the first text as the next piece of broadcast data.

Steps S10341 to S10344 are similar to the above-mentioned steps S10331 to S10334, which are not repeatedly described here.

By means of the above steps S10341 to S10344, the present disclosure can support specified broadcasting of the following paragraph, which can overcome the defect that broadcasting such as TTS broadcasting in the related art cannot support forward and backward broadcasting.

It should be noted that, after the next piece of broadcast data required for the specified broadcasting is prepared, it is also required to establish and/or update the association information for the next piece of broadcast data in the second storage space, so as to recognize the current broadcast position for next specified broadcasting.

As described above, when the user initiates the specified broadcast request, the next piece of broadcast data is acquired from the first text in response to receiving the specified broadcast request, and the association information for the next piece of broadcast data is stored in the second storage space. The examples of acquiring the next piece of broadcast data and storing the association information during sequential reading is described above with reference to FIGS. 7A to 7D. In the following, the examples of acquiring the next piece of broadcast data and storing the association information in the case of specified broadcasting will be described with reference to FIGS. 14A to 14C.

Assuming that when the third line of the second piece of broadcast data (the current broadcast data) illustrated in FIG. 7D is currently read, the user initiates the specified broadcast request to read the previous line, it is determined, according to the association information about the current broadcast data stored in the second storage space, that the current reading position is the fourth line of the text area. Then, it can be determined that the position to be broadcasted is the third line of the text area. Thus, the position to be broadcasted may be used as the start position to organize the next piece of broadcast data.

As described above, with regard to the organization of the next piece of broadcast data, at least one line of text data may be acquired from the first text as the next piece of broadcast data.

Figure 14A:
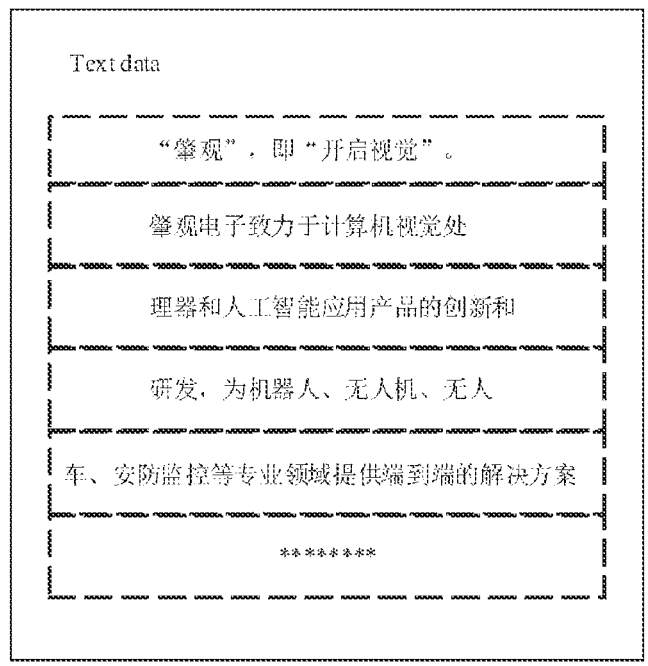
FIGS. 14A, 14B, and 14C illustrate a method and process of constructing association information for a next piece of broadcast data and storing the association information in a second storage space in response to a specified broadcast indication according to exemplary embodiments of the present disclosure.

It is assumed that, as illustrated in FIG. 14A, at least five lines of text data illustrated in FIG. 3A have been stored in the current first text, and the five lines of text data are a segment of text in the text area. For example, the text data from the third line (as the start position of the position to be broadcasted) to the fifth line (the last line of the paragraph where the position to be broadcasted is positioned) can be acquired from the first text as the next piece of broadcast data and stored in the third storage space, as illustrated in FIG. 14B.

After the next piece of broadcast data is determined, the association information for the next piece of broadcast data can be established in the second storage space, and the method for establishing the association information is similar to that illustrated in FIGS. 3A to 3C.

Figure 14B:
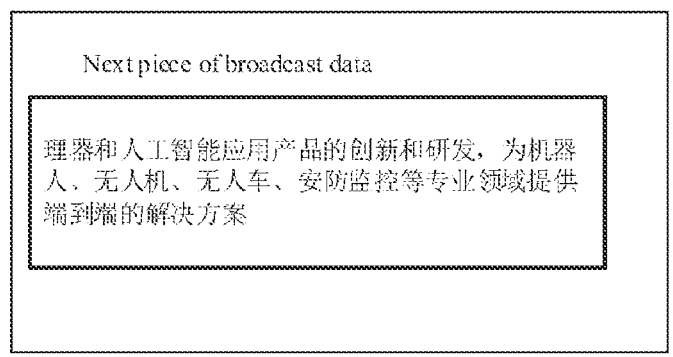

The corresponding data, in the first text, corresponding to the next piece of broadcast data illustrated in FIG. 14B has three lines, the first line of the corresponding data is the third line of text data in the first text, i.e., "理器和人工智能应用产品的创新 (Chinese characters, which mean innovation of processor and AI application products)", and the number of characters can be calculated as 30. The second line of the corresponding data is the fourth line of text data in the first text, i.e., "研发，为机器人、无人机、无人 (Chinese characters, which mean development, for robots, UAV, unmanned)", and the number of characters can be calculated as 25. The third line of the corresponding data is the fifth line of text data in the first text, i.e., "车、安防监控等专业领域提供端到端的解决方案 (Chinese characters, which mean providing end-to-end solutions in professional fields such as vehicle and security monitoring)", and the number of characters can be calculated as 41. Thus, the total number of characters in the corresponding data is (30+25+41)=96. The cut-off proportion of the first line of data in the corresponding data is 30/96=31%, the cut-off proportion of the second line of data is (30+25)/96=57%, and the cut-off proportion of the third line of data is (30+25+41)/96=100%.

As described above, the cut-off proportion of the last line of data can also be directly determined as 100% without calculation.

Then, the association information for the next piece of broadcast data stored in the second storage space can be constructed.

For the case of specified broadcasting of the following line, specified broadcasting of the previous paragraph or specified broadcasting of the following paragraph, it is similar to specified broadcasting of the previous line, and details are not repeatedly described here.

In addition, for the organization of the next piece of broadcast data, as in the above example, the text data in the paragraph starting from the position to be broadcasted may be used as the next piece of broadcast data (in the case that the first text has stored enough text data), or several lines starting from the position to be broadcasted may be selected as the next piece of broadcast data. These several lines may be in the same paragraph (natural segment), or may be in different paragraphs (that is, the several lines may cross paragraphs).

According to some embodiments, correspondingly storing association information for the next piece of broadcast data in the second storage space may include: storing the position, in the first text, of each line of data in the corresponding data corresponding to the next piece of broadcast data; and storing the cut-off proportion in the corresponding data for each line of data in the corresponding data.

According to some embodiments, the position, in the first text, of each line of data in the corresponding data corresponding to the next piece of broadcast data includes the line number of the line of data, or the paragraph number and the line number of the line of data.

Figure 14C:
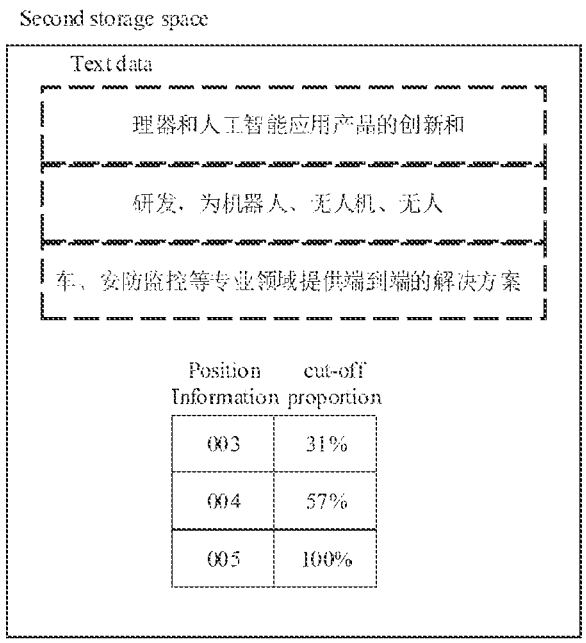

In the example illustrated in FIG. 14C, the position information, in the first text, of each line of data in the corresponding data is the line number. Here, as described above, the position information may also include both the line number and the paragraph number. For example, the three pieces of position information illustrated in FIG. 14C may also be [001003], [001004], and [001005] respectively, where 001 represents the first paragraph, 003, 004, and 005 represent the third, the fourth, and the fifth line respectively. Thus, [001003], [001004], and [001005] may represent the third line in the first paragraph, the fourth line in the first paragraph, and the fifth line in the first paragraph respectively.

According to some embodiments, the user may express his/her intention of specified broadcasting and the specified type of specified broadcasting by operating the corresponding button or sliding operation on the touch screen. Thus, the corresponding operation can be detected, and the corresponding specified broadcast indication can be generated when the corresponding operation is detected.

Figure 15:
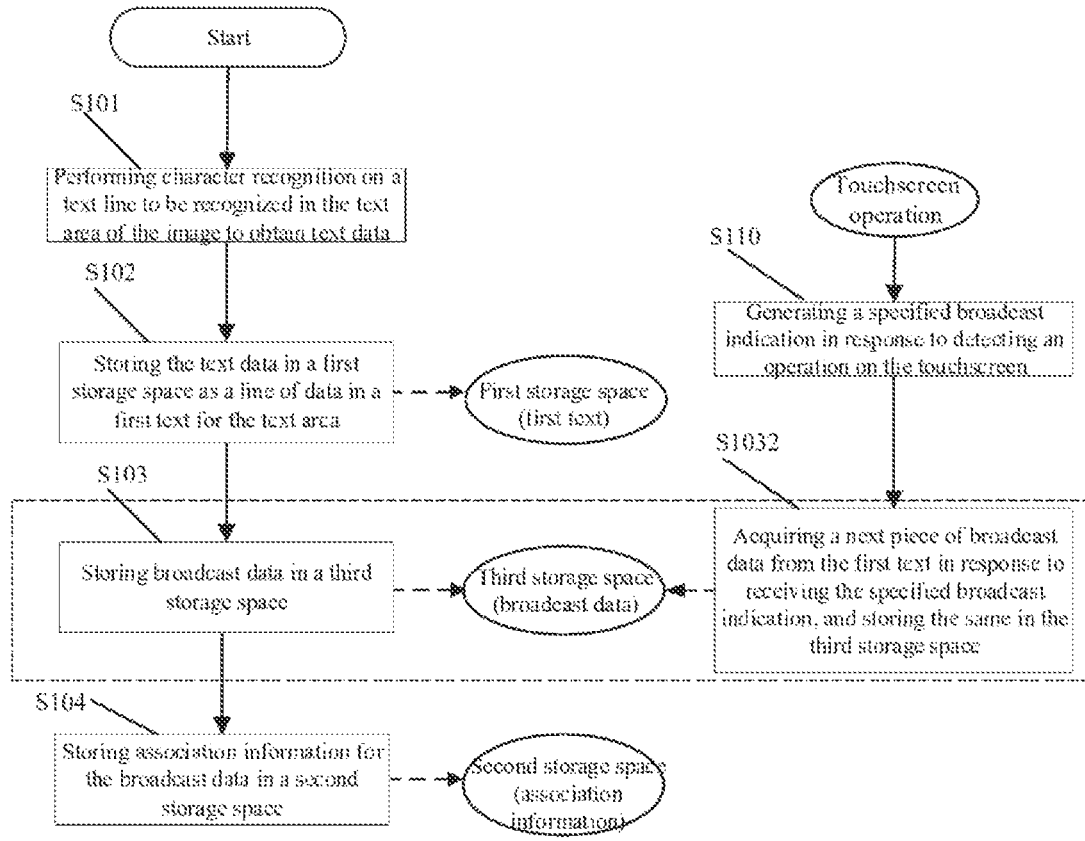
FIG. 15 is a flowchart illustrating an image text broadcasting method according to another exemplary embodiment of the present disclosure.

According to some embodiments, as illustrated in FIG. 15, the image text broadcasting method according to the present disclosure may further include: generating the specified broadcast indication in response to detecting an operation on the touchscreen (block S110). That is, the specified broadcast indication is generated in response to the specific operation on the touchscreen.

For example, according to some embodiments, generating the specified broadcast indication in response to detecting the operation on the touchscreen may include: in response to detecting a first touchscreen operation on the touchscreen, generating the specified broadcast indication with the specified broadcast type of broadcasting the previous line; and in response to detecting a second touchscreen operation on the touchscreen, generating the specified broadcast indication with the specified broadcast type of broadcasting the following line.

For another example, according to some embodiments, generating the specified broadcast indication in response to detecting the operation on the touchscreen may include: in response to detecting a third touchscreen operation on the touchscreen, generating the specified broadcast indication with the specified broadcast type of broadcasting the previous paragraph; and in response to detecting a fourth touchscreen operation on the touchscreen, generating the specified broadcast indication with the specified broadcast type of broadcasting the following paragraph.

The various touchscreen operations may include the slide operation on the touchscreen. For example, the first touchscreen operation may be, for example, a left slide operation, the second touchscreen operation may be, for example, a right slide operation, the third touchscreen operation may be, for example, an upward slide operation, and the fourth touchscreen operation may be, for example, a downward slide operation. In addition, the touchscreen operation may further include operations such as click operation, long press operation on the touchscreen, etc. The corresponding specified broadcast type may be set in conjunction with different forms of touchscreen operations. Certainly, the corresponding specified broadcast type may also be set in conjunction with touchscreen operations at different positions on the touchscreen. Alternatively, the corresponding specified broadcast type may also be set based on the combination of different forms of touchscreen operations and different positions on the touchscreen.

Details will be described below by way of examples. For example, in the case of slide operation on the touchscreen, the corresponding operation and its meaning may be as follows. In addition, for the specified broadcast request of forward and backward, the text data in the first text may not always meet the requirements. In this case, prompt information may be provided. Specific illustration is provided below.

For example, for a reading device that does not have the display screen but has the touchscreen, the user may express his/her reading intention by performing the slide operation on the touchscreen. In the following, as an example, the slide operation will be illustrated by using the horizontal direction of the touchscreen of the reading device as the reference for the left and right directions, and the longitudinal direction of the touchscreen as the reference for the upward and downward directions.

Left Slide Operation, Indicating "Broadcasting the Previous Line"

When the current broadcast text data is the data at the beginning of the first text (for example, the first line), prompt information such as "it is already the first line" may be provided to the user.

Right Slide Operation, Indicating "Broadcasting the Following Line"

When recognition of the text area is completed, and the current broadcast text data is the data at the end of the first text (and also the end of the text area), prompt information such as "it is already the last line" may be provided to the user.

When the recognition of the text area is not completed, and the current broadcast text data is the data at the end of the first text but not at the end of the text area (that is, there is some text data in the text area that has not been recognized and stored in the stored text), prompt information such as "recognizing, please wait a moment" may be provided to the user.

Upward Slide Operation, Indicating "Broadcasting the Previous Paragraph"

When the current broadcast text data is the data at the first paragraph of the first text, prompt information such as "it is already the first paragraph" may be provided to the user.

Downward Slide Operation, Indicating "Broadcasting the Following Paragraph"

When recognition of the text area is completed, and the current broadcast text data is the data at the last paragraph of the first text (and also the last paragraph of the text area), prompt information such as "it is already the last paragraph" may be provided to the user.

When recognition of the text area is not completed, and the current broadcast text data is the data at the last paragraph of the first text but not at the last paragraph of the text area, prompt information such as "recognizing, please wait a moment" may be provided to the user.

Alternatively, the above prompt information may also be the prompt such as "recognizing" or "there is no specified position".

Several illustrative situations for specified broadcasting in the case of the slide operation are exemplified above. It should be noted that the present disclosure is not limited to the exemplified illustrative situations here, and may further include other more specified broadcast operations. In addition, the left, right, upward, and downward slide are merely examples. In actual implementation, the form of the example here does not have to be adopted, and various forms of alternatives, modifications, or extensions may be adopted.

With regard to the text lines and text paragraphs, various layout analysis methods may be used to determine a text line in the text area and a text paragraph in the text area, which will not be described in detail here.

In addition, according to some embodiments, the user (for example, the visually impaired user and the hearing-impaired user) may express his/her intention of specified broadcasting and the specified type of specified broadcasting by performing the corresponding action. For example, for the visually impaired user, as well as for the hearing-impaired user (broadcasting may be performed by means of vibration, for example), when the content in the text area cannot be seen or cannot be seen clearly, gestures may be used as the signal or notification for specified broadcasting. Alternatively, when content in the text area can be seen clearly, a guide object (for example, a finger, etc.) may be placed at the position, in the text area, where the user wants to be broadcasted as the signal or notification of specified broadcasting. In this case, the action of the user may be captured by using, for example, a camera, and then the image captured by the camera may be analyzed, so as to determine whether the user wants to make specified broadcasting, and which type of specified broadcasting is to be made.

In view of the fact that the user may make many actions, in the present disclosure, this is not limited. In addition, the condition that the user expresses his/her intention of specified broadcasting and the specified type of the specified broadcasting by actions may be similar to the case that the user expresses his/her intention of specified broadcasting and the specified type of the specified broadcasting by performing corresponding operations, details are not repeatedly described here.

The present disclosure can improve reading experience of the user (such as visually impaired and hearing-impaired users) by providing specified broadcasting functions.

According to some embodiments, the position of each line of data in the first text may be stored in the first storage space, such that each time the broadcast data is prepared, the stored information of the required position can be directly obtained from the first storage space. However, the position of each line of data in the first text may not be stored in the first storage space, because each line of data in the first text is corresponding to each text line in the text area, in other words, the first text has the information about the line position of the corresponding text line in the text area.

In addition, for the text paragraph position, when the paragraph position of each line of data is not stored in the first storage space, a specific paragraph indication mark may be set at the corresponding position in the first text to represent each paragraph, or the first text may also be stored in the first storage space in the manner of the text paragraph in the text area, such that the first text can have information about the paragraph position corresponding to the text paragraph in the text area.

As described above, the broadcast data may be actively acquired by the broadcasting apparatus, or may be acquired by a processing apparatus from the third storage space and provided to the broadcasting apparatus.

According to some embodiments, the number of characters in the corresponding text line may also be stored similarly to the storage of the position information and the cut-off percentage. For example, the number of characters in the corresponding text line may be stored in the first storage space and/or the second storage space. When the number of characters in the corresponding text line is stored, the required cut-off proportion can be quickly calculated, and/or the position of text data can be quickly positioned.

Thus, in addition to the position and the cut-off proportion, the association information may further include the number of characters.

Based on actual demands, specified broadcasting may occur in the process of sequential broadcasting. During sequential broadcasting, the user may need to rehear the broadcasted data. In this case, the specified broadcasting may be initiated, and specified broadcasting may be interrupt or terminate the ongoing sequential broadcasting, and then the required specified broadcasting starts.

According to some embodiments, for the specific type of text line, the specific type position identifier representing the type of text line is stored, and a prompt may be provided to the user during broadcasting, based on the specific type position identifier.

For the specific type of text line, the specific type identifier representing the type of the text line may be stored. During broadcasting, when it is determined that a certain text line to be broadcasted corresponds to the specific type identifier, the corresponding prompt may be provided to the user. For example, when it is determined that the text line to be broadcasted is a heading line, prompt information such as "this is a heading line" may be provided to the user. When it is determined that a text line to be broadcasted is a fuzzy line, prompt information such as "this line of text cannot be recognized, please understand" may be provided to the user.

According to some embodiments, the prompts described above may include a speech prompt, a vibration prompt, a text prompt, an image prompt, and a video prompt, or a combination thereof, so as to facilitate the users' various needs.

According to some embodiments, the specific type of text line includes: a first type of text line, in which the first type of text line is determined based on a text size; and a second type of text line, in which the second type of text line is determined based on text line definition.

For example, the first type of text line may be the heading line, the page header, the page footer, and the like, the text size of these lines are usually different from other text lines.

In addition, the second type of text line may refer to the text line that cannot be clearly recognized, for example, the text line with low text definition (for example, less than a preset text definition threshold).

According to some embodiments, the text line may be arranged horizontally, vertically, or diagonally.

Figure 16:
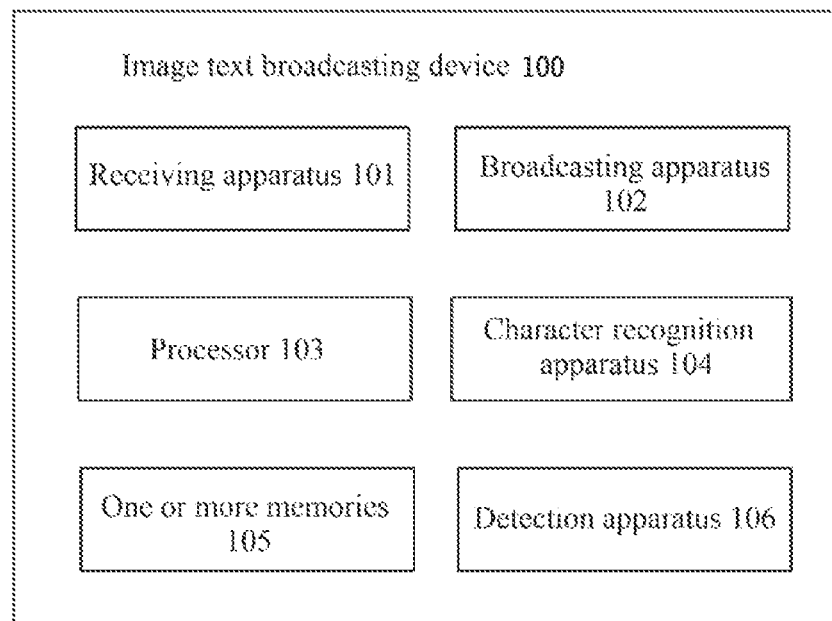
FIG. 16 is a block diagram illustrating an image text broadcasting device according to exemplary embodiments of the present disclosure.

According to some embodiments, as illustrated in FIG. 16, the present disclosure further provides an image text broadcasting device 100, and the image text broadcasting device 100 may include a receiving apparatus 101, a broadcasting apparatus 102, and a processor 103.

The receiving apparatus 101 may be configured to receive a specified broadcast indication. The broadcasting apparatus 102 may be configured to determine a current broadcast progress about broadcast data in response to the specified broadcast indication. The processor 103 may be configured to acquire, according to the current broadcast progress and the specified broadcast indication, the next piece of broadcast data from the first text for broadcasting by the broadcasting apparatus.

As described above, the first text is composed of text data recognized and stored by a character recognition apparatus for the text in the text area of the image.

The image text broadcasting device 100 according to exemplary embodiments of the present disclosure can support specified broadcasting.

According to some embodiments, the image text broadcasting device 100 may further include a character recognition apparatus 104 and at least one memory 105.

The character recognition apparatus 104 may be configured to perform character recognition on the text line to be recognized in the text area of the image to obtain text data.

The at least one memory 105 may be configured to: store the text data of the text line in a first storage space of the at least one memory as a line of data in the first text in the text area; store broadcast data in a third storage space of the at least one memory; and store association information for the broadcast data in a second storage space of the at least one memory. The association information is configured to make the broadcast data in the third storage space positionally correspond to corresponding data in the first text in the first storage space.

According to some embodiments, the broadcasting apparatus 102 may be configured to acquire the broadcast data from the third storage space, and perform sequential broadcasting or specified broadcasting on the text area.

According to some embodiments, the processor 103 may be configured to acquire the next piece of broadcast data from the first text in the first storage space in response to receiving the specified broadcast indication and the current broadcast progress from the broadcasting apparatus 102, and store the same in the third storage space.

According to some embodiments, the image text broadcasting device 100 may further include a detection apparatus 106, the detection apparatus 106 may be configured to generate the specified broadcast indication in response to detecting a specified broadcast operation, and send the specified broadcast indication to the processor. Here, the detection apparatus may be an input device, or may be other detection component configured to detect input or operations.

According to some embodiments, the specified broadcast operation may include various touchscreen operations (such as the first, second, third, and fourth touchscreen operation). For example, the specified broadcast operation may include left slide on the touchscreen and right slide on the touchscreen. The specified broadcast operation may further include upward slide on the touchscreen and downward slide on the touchscreen.

According to some embodiments, the association information for the broadcast data may include at least: the position, in the first text, of each line of data in the corresponding data positionally corresponding to the broadcast data; and the cut-off proportion in the corresponding data for each line of data in the corresponding data.

Here, the cut-off proportion of each line of data in the corresponding data to the corresponding data is determined by the processor 103 by calculating the proportion of the number of characters from a start line of data in the corresponding data to the line of data to the total number of characters of the corresponding data.

According to some embodiments, in response to performing storage in the third storage space each time, the processor 103 may construct and/or update the association information for the next piece of broadcast data stored in the second storage space.

According to some embodiments, the broadcasting apparatus 102 may broadcast the previous line of the current broadcast text line in response to the first touchscreen operation (for example, the left slide operation) on the touchscreen, and broadcast the following line of the current broadcast text line in response to the second touchscreen operation (for example, the right slide operation) on the touchscreen. In addition, the broadcasting apparatus may further broadcast the previous paragraph of the current broadcast text paragraph in response to the third touchscreen operation (for example, the upward slide operation) on the touchscreen, and broadcast the following paragraph of the current broadcast text paragraph in response to the fourth touchscreen operation (for example, the downward slide operation) on the touchscreen.

According to some embodiments, in response to the specified broadcasting operation, the broadcasting apparatus may send prompt information such as "recognizing" or "there is no specified position" to the user.

For the image text broadcasting device 100, when the user initiates the specified broadcast operation, the detection apparatus 106 in the device 100 may detect the specified broadcast operation of the user, generate the specified broadcast indication, and send the specified broadcast indication to, for example, the processor 103 or the broadcasting apparatus 102.

When the processor receives the specified broadcast indication, the processor may analyze the specified broadcast indication, and request current broadcast progress information from the broadcasting apparatus, so as to start preparing specified broadcast data required for the specified broadcasting.

When the broadcasting apparatus 102 receives the specified broadcast indication, the broadcasting apparatus may determine the current broadcast progress, and may analyze or may not analyze the specified broadcast indication, and then send the current broadcast progress and the specified broadcast indication to the processor 103. After the processor 103 receives the specified broadcast indication and the current broadcast progress, it may start to prepare the next piece of broadcast data (specified broadcast data).

The process of determining the next piece of broadcast data is similar to the above process described in conjunction with block S103. The processor 103 obtains the current broadcast position (the position in the first text) corresponding to the current broadcast progress based on the current broadcast progress and the association information for current broadcast data stored in the second storage space in the memory 105, and then determines the position to be broadcasted based on the specified broadcast indication.

After the position to be broadcasted is determined, the processor may acquire several lines of text data starting from the position to be broadcasted from the first text as the next piece of broadcast data, such that the memory 105 stores the next piece of broadcast data in the third storage space for the broadcasting apparatus 102 to access, to perform required specified broadcasting.

In addition, according to some embodiments, in addition to providing broadcasting in the form of speech or vibration, the image text broadcasting device 100 may further provide display functions. Thus, the image text broadcasting device may include a display apparatus configured to display, for example, data currently being broadcasted or the current broadcast progress (for example, the broadcast position).

The operations of various apparatuses and/or components in the image text broadcasting device are similar to steps performed in the above image text broadcasting method, which is not repeatedly described here.

According to another aspect of the present disclosure, an electronic circuit is further provided. The electronic circuit may include a circuit configured to perform the steps of the method described above.

According to another aspect of the present disclosure, a reading device is provided. The reading device includes the electronic circuit described above, and a circuit configured to broadcast text data.

According to some embodiments, the reading device performs sequential broadcasting or specified broadcasting by the circuit configured to broadcast the text data, in response to operations or actions of the user.

The operation of the user may refer to the user's operation on the reading device, such as operations on the switch, the button, the screen, and the like.

The action of the user may refer to actions made by the user through body parts such as hands or head, to trigger the reading device to broadcast. For example, nodding head once may represent a command for sequential broadcasting, and nodding head twice within a short time interval may represent a command for specified broadcasting.

The meaning of the user operation or action may be designed according to actual demands. In addition, parameters in the above indication may be further designed according to actual demands.

According to another aspect of the present disclosure, an electronic device is provided, which includes: a processor; and a memory storing a program, the program including instructions that, when executed by the processor, cause the electronic device to perform the method described above.

According to another aspect of the present disclosure, a non-transitory computer-readable storage medium storing a program is provided, the program including instructions that, when executed by a processor of an electronic device, cause the electronic device to perform the method described above.

Figure 17:
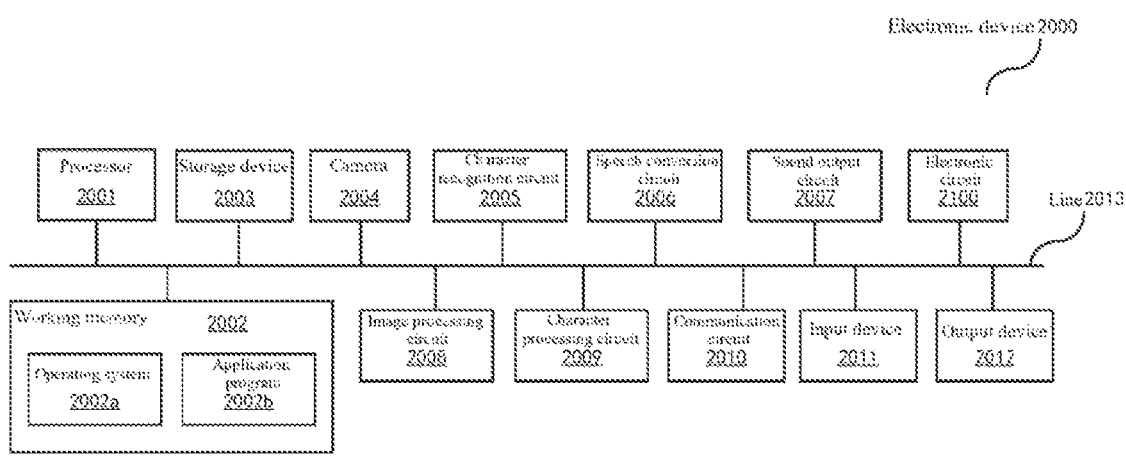
FIG. 17 is a block diagram illustrating an electronic device according to exemplary embodiments of the present disclosure.

FIG. 17 is a block diagram illustrating an example of an electronic device according to exemplary embodiments of the present disclosure. It should be noted that, the structure illustrated in FIG. 17 is merely an example. According to specific implementation, the electronic device in the present disclosure may include only one or more of components illustrated in FIG. 17.

The electronic device 2000 may be, for example, a general-purpose computer (for example, various computers such as a laptop computer and a tablet computer), a mobile phone, or a personal digital assistant. According to some embodiments, the electronic device 2000 may be a reading assisting device (or simply referred to as a reading device).

The electronic device 2000 may be configured to capture the image, process the captured image, and provide the corresponding broadcast service or prompt in response to the processing. For example, the electronic device 2000 may be configured to capture the image, perform character detection and recognition on the image to obtain text data, convert the text data into speech data, and output the speech data for the user to hear, and/or output the text data for the user to view on, for example, a display apparatus (such as a normal display screen or a touch display screen).

According to some implementations, the electronic device 2000 may be configured to include an eyeglass frame, or configured to be detachably installed on the eyeglass frame (for example, a rim of the eyeglass frame, a connecting piece that connects two rims, an eyeglass leg, or any other parts), such that the image included in the field of view of the user can be captured.

According to some implementations, the electronic device 2000 may also be installed on another wearable device, or may be integrated with another wearable device. The wearable device may be, for example, a head-mounted device (for example, a helmet or a hat), a device that can be worn on ears, etc. According to some embodiments, the electronic device may be implemented as accessories attached to the wearable device, for example, accessories attached to the helmet or the hat, etc.

According to some implementations, the electronic device 2000 may also have other forms. For example, the electronic device 2000 may be a mobile phone, a general-purpose computing device (for example, a laptop computer, a tablet computer, etc.), a personal digital assistant, etc. The electronic device 2000 may also have a base, such that the electronic device can be placed on the desktop.

According to some implementations, as a reading assisting device (reading device) or an image text broadcasting device, the electronic device 2000 may be used for assisting in reading. In this case, the electronic device 2000 is sometimes also referred to as an "e-reader" or a "reading assisting device". By means of the electronic device 2000, users who cannot read autonomously (for example, the visually impaired person, the dyslexic person, and the hearing-impaired person) can implement "reading" of conventional reading material (for example, a book, a magazine, etc.) in the posture similar to the reading posture. During "reading", the electronic device 2000 may acquire the image, perform character recognition on the text line in the image to obtain text data, and store the obtained text data, such that the text data can be quickly broadcasted, and the broadcast text data has semantic cohesion and context, thereby avoiding rigid pauses caused by line-by-line or word-by-word broadcast. Moreover, the electronic device 2000 can support specified reading, determine the specified reading demand of the user by detecting the user operation on the electronic device or the user action during the reading process, and broadcast content required for the specified reading for the user, which makes it more convenient for users to use and improves user experience.

The electronic device 2000 may include a camera 2004 configured to capture and acquire the image. The camera 2004 may capture a static image or a dynamic image. The camera 2004 may include, but is not limited to, a webcam, a camera, a video camera, etc., and may be configured to acquire the initial image including the object to be recognized. The electronic device 2000 may further include an electronic circuit 2100, and the electronic circuit 2100 may include a circuit configured to perform the steps of the method described above. The electronic device 2100 may further include a character recognition circuit 2005, and the character recognition circuit 2005 is configured to perform character detection and recognition (for example, OCR processing) on characters in the image so as to obtain character data. The character recognition circuit 2005 may be implemented, for example, by a dedicated chip. The electronic device 2000 may further include a speech conversion circuit 2006, and the speech conversion circuit 2006 is configured to convert the character data into speech data. The speech conversion circuit 2006 may be implemented, for example, by a dedicated chip. The electronic device 2000 may further include a speech output circuit 2007, and the speech output circuit 2007 is configured to output the speech data. The speech output circuit 2007 may include, but is not limited to a headphone, a loudspeaker, or a vibrator, etc., and its corresponding drive circuit.

According to some implementations, the electronic device 2000 may further include an image processing circuit 2008, and the image processing circuit 2008 may include a circuit configured to perform various image processing on the image. The image processing circuit 2008 may include, for example, but is not limited to, one or more of: a circuit configured to perform noise reduction on the image, a circuit configured to perform defuzzification on the image, a circuit configured to perform geometric correction on the image, a circuit configured to perform feature extraction on the image, a circuit configured to perform target detection and recognition on a target object in the image, a circuit configured to perform character detection on characters included in the image, a circuit configured to extract the text line from the image, a circuit configured to extract character coordinates from the image, etc.

According to some implementations, the electronic circuit 2100 may further include a character processing circuit 2009, and the character processing circuit 2009 may be configured to perform various processing based on extracted character-related information (for example, text data, text boxes, paragraph coordinates, text line coordinates, and text coordinates), so as to obtain processing results, such as paragraph sorting, character semantic analysis, and layout analysis results.

One or more of the above-mentioned various circuits (for example, the character recognition circuit 2005, the speech conversion circuit 2006, the speech output circuit 2007, the image processing circuit 2008, the character processing circuit 2009, and the electronic circuit 2100) may be implemented by using customized hardware, and/or hardware, software, firmware, middleware, microcode, hardware description language, or any combination thereof. For example, one or more of the circuits mentioned above may be implemented by programming hardware (for example, the programmable logic circuit including a field programmable gate array (FPGA) and/or a programmable logic array (PLA)) in assembly language or hardware programming language (such as VERILOG, VHDL, and C++) by using the logic and algorithm in the present disclosure.

According to some implementations, the electronic device 2000 may further include a communication circuit 2010. The communication circuit 2010 may be any type of device or system that enables communication with external devices and/or network, and may include, but is not limited to, a modem, a network card, an infrared communication device, a wireless communication device and/or a chipset, such as a Bluetooth device, a 1302.11 device, a WiFi device, a WiMax device, a cellular communication device, and/or the like.

According to some implementations, the electronic device 2000 may further include an input device 2011. The input device 2011 may be any type of device capable of inputting information to the electronic device 2000, and may include, but is not limited to, various sensors, a mouse, a keyboard, a touchscreen, a button, a joystick, a microphone, a remote controller, and/or the like.

According to some implementations, the electronic device 2000 may further include an output device 2012. The output device 2012 may be any type of device capable of presenting information, and may include, but is not limited to, a display, a visual output terminal, a vibrator, a printer, and/or the like. Although the electronic device 2000 is used for a reading assisting device according to some embodiments, a vision-based output device may assist a family member of the user, a maintenance staff, etc. in obtaining output information from the electronic device 2000.

According to some implementations, the electronic device 2000 may further include a processor 2001. The processor 2001 may be any type of processor and may include, but is not limited to, one or more general purpose processors and/or one or more dedicated processors (for example, special processing chips). The processor 2001 may be, for example, but is not limited to, a central processing unit (CPU) or a microprocessor unit (MPU). The electronic device 2000 may further include a working memory 2002. The working memory 2002 may be a working memory that stores programs (including instructions) and/or data (for example, an image, characters, a voice, and other intermediate data) useful to the working of the processor 2001, and may include, but is not limited to, a random-access memory and/or read-only memory device. The electronic device 2000 may further include a storage device 2003. The storage device 2003 may include any non-transitory storage device. The non-transitory storage device may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions and/or codes. The working memory 2002 and the storage device 2003 may be collectively referred to as "memories", and may be interchangeably used in some cases. The memory may store the above-mentioned first text stored in the first storage space, association information stored in the second storage space (and related data corresponding to the broadcast data), and the broadcast data stored in the third storage space. As mentioned above, the present disclosure does not limit whether the first storage space, the second storage space, and the third storage space are in the same storage apparatus, as long as the required functions can be realized.

According to some implementations, the processor 2001 may control and schedule at least one of the camera 2004, the character recognition circuit 2005, the speech conversion circuit 2006, the speech output circuit 2007, the image processing circuit 2008, the character processing circuit 2009, the communication circuit 2010, the electronic circuit 2100, the input device 2011, the output device 2012, and other various apparatuses and circuits included in the electronic device 2000. According to some implementations, at least some of the constituent parts described in FIG. 17 may be interconnected and/or communicate with each other through a line 2013.

Software elements (programs) may be positioned in the working memory 2002, and may include, but is not limited to, an operating system 2002a, one or more application programs 2002b, drivers, and/or other data and codes.

According to some implementations, the instructions for the above-mentioned control and scheduling may be included in the operating system 2002a or the one or more application programs 2002b.

According to some implementations, the instructions for performing the method steps described in the present disclosure may be included in the one or more application programs 2002b, and the above-mentioned modules of the electronic device 2000 may be implemented by the processor 2001 reading and executing the instructions of the one or more application programs 2002b. In other words, the electronic device 2000 may include the processor 2001 and a memory (for example, the working memory 2002 and/or the storage device 2003) that stores a program, the program including instructions that, when executed by the processor 2001, cause the processor 2001 to perform the method of various embodiments of the present disclosure.

According to some implementations, some or all of the operations performed by at least one of the character recognition circuit 2005, the speech conversion circuit 2006, the speech output circuit 2007, the image processing circuit 2008, the character processing circuit 2009, the communication circuit 2010, the electronic circuit 2100, the input device 2011, the output device 2012, and the electronic device 2000 and may be implemented by the processor 2001 reading and executing the instructions of the one or more application programs 2002b.

Executable code or source code of the instructions of the software elements (programs) may be stored in a non-transitory computer-readable storage medium (for example, the storage device 2003), and may be stored into the working memory 2002 when executed (may be compiled and/or installed). Thus, the present disclosure provides a computer-readable storage medium storing a program, the program including instructions that, when executed by a processor of an electronic device (for example, a reading device), cause the electronic device to perform the method of various embodiments of the present disclosure. According to another implementation, the executable codes or source codes of the instructions of the software elements (programs) may also be downloaded from a remote position.

It should also be understood that various variations may be made according to specific requirements. For example, custom hardware may also be used, and/or various circuits, units, modules, or components may be implemented by using hardware, software, firmware, middleware, microcode, hardware description languages, or any combination thereof. For example, some or all of the circuits, units, modules, or components included in the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm according to the present disclosure.

According to some implementations, the processor 2001 in the electronic device 2000 may be distributed over a network. For example, some processing may be executed by one processor while other processing may be executed by another processor away from the one processor. Other modules of the electronic device 2000 may also be similarly distributed. In this way, the electronic device 2000 can be interpreted as a distributed computing system that performs processing at a plurality of positions.

Although the embodiments or examples of the present disclosure have been described with reference to the drawings, it should be understood that the methods, systems and devices described above are merely exemplary embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various manners. It is important that, as the technology evolves, many elements described herein may be replaced with equivalent elements that appear after the present disclosure.

What is claimed is:

1. An image text broadcasting method, comprising:
   receiving a specified broadcast indication, wherein the specified broadcast indication is used for indicating that a user requires a broadcasting apparatus to broadcast specified data;
   determining a current broadcast progress about broadcast data in response to the specified broadcast indication; and
   acquiring a next piece of broadcast data from a first text according to the current broadcast progress and the specified broadcast indication, wherein the first text is composed of text data recognized and stored for a text in a text area of an image;
   the method further comprises:
   performing character recognition on a text line to be recognized in the text area of the image to obtain text data, and storing the text data of the text line in a first storage space as a line of data in the first text;
   storing the broadcast data in a third storage space; and
   storing association information for the broadcast data in a second storage space, wherein the association information is used for making the broadcast data in the third storage space positionally correspond to corresponding data in the first text in the first storage space,
   wherein the association information for the broadcast data comprises at least:
      a position, in the first text, of each line of data in the corresponding data positionally corresponding to the broadcast data; and
      a cut-off proportion in the corresponding data for each line of data in the corresponding data,
      wherein the cut-off proportion in the corresponding data for each line of data in the corresponding data is determined based on a proportion of a number of characters from a start line of data in the corresponding data to the line of data to a total number of characters of the corresponding data.

2. The method according to claim 1, wherein storing the broadcast data in the third storage space comprises:
   storing text data of a newly recognized text line in the third storage space as at least a part of the next piece of broadcast data in a sequential broadcast mode, when current broadcast data is stored in the third storage space.

3. The method according to claim 2, wherein,
   in response to performing storage in the third storage space each time, constructing and/or updating association information for the next piece of broadcast data stored in the second storage space.

4. The method according to claim 1, wherein text data obtained by performing character recognition on a first text line to be recognized in the text area is taken as a piece of broadcast data separately.

5. The method according to claim 1, wherein storing the broadcast data in the third storage space comprises:
when current broadcast data is stored in the third storage space, in response to receiving the specified broadcast indication, acquiring the next piece of broadcast data from the first text and storing the same in the third storage space.

6. The method according to claim 1, wherein acquiring the next piece of broadcast data from the first text comprises:
determining a current broadcasted position in current broadcast data as the current broadcast progress in response to receiving the specified broadcast indication;
determining a position in the first text that corresponds to the current broadcast progress as a current broadcast position based on the current broadcast progress and association information for the current broadcast data in the second storage space;
determining a position to be broadcasted in the first text based on the current broadcast position and a specified broadcast type in the specified broadcast indication; and
acquiring, by using the position to be broadcasted as a start position, the next piece of broadcast data from the first text and storing the same in the third storage space, and calculating and correspondingly storing association information for the next piece of broadcast data in the second storage space.

7. The method according to claim 6, wherein determining the position in the first text that corresponds to the current broadcast progress as the current broadcast position based on the current broadcast progress and association information for the current broadcast data in the second storage space comprises:
comparing the current broadcast progress with a cut-off proportion for the current broadcast data stored in the second storage space, and determining a position of the current broadcast data stored in the second storage space and corresponding to a minimum cut-off proportion in a cut-off proportion greater than the current broadcast progress, as the current broadcast position.

8. The method according to claim 6, wherein calculating and correspondingly storing association information for the next piece of broadcast data in the second storage space comprises:
storing, in the second storage space, a position of each line of data in the corresponding data positionally corresponding to the next piece of broadcast data in the first text; and
calculating a cut-off proportion in the corresponding data for each line of data in the corresponding data and storing the same in the second storage space.

9. The method according to claim 1, wherein a specified broadcast type in the specified broadcast indication comprises broadcasting an adjacent text unit, and
the adjacent text unit is adjacent to a text unit where a current broadcasted text line is positioned.

10. The method according to claim 9, wherein broadcasting the adjacent text unit comprises broadcasting a previous line or broadcasting a following line, and the position, in the first text, of each line of data in the current broadcast data stored in the second storage space comprises a line number of the line of data; and
acquiring the next piece of broadcast data from the first text comprises:
determining a current broadcasted position in the current broadcast data as the current broadcast progress in response to receiving the specified broadcast indication;
determining, based on the current broadcast progress and the association information for the current broadcast data stored in the second storage space, a line number of a text line in the first text that corresponds to a line of data corresponding to the current broadcast progress in the current broadcast data as a current broadcast line number;
using the current broadcast line number minus 1 as a line number to be broadcasted based on the specified broadcast type of broadcasting the previous line, or using the current broadcast line number plus 1 as a line number to be broadcasted based on the specified broadcast type of broadcasting the following line; and
acquiring at least one line of data from the first text as the next piece of broadcast data, by using a line where the line number to be broadcasted is positioned as a start position.

11. The method according to claim 9, wherein broadcasting the adjacent text unit comprises broadcasting a previous paragraph or broadcasting a following paragraph, and the position, in the first text, of each line of data in the current broadcast data stored in the second storage space comprises a paragraph number of the line of data; and
acquiring the next piece of broadcast data from the first text comprises:
determining a current broadcasted position in the current broadcast data as the current broadcast progress in response to receiving the specified broadcast indication;
determining, based on the current broadcast progress and the association information for the current broadcast data stored in the second storage space, a paragraph number of a text line in the first text that corresponds to a line of data corresponding to the current broadcast progress in the current broadcast data as a current broadcast paragraph number;
using the current broadcast paragraph number minus 1 as a paragraph number to be broadcasted based on the specified broadcast type of broadcasting the previous paragraph, or using the current broadcast paragraph number plus 1 as a paragraph number to be broadcasted based on the specified broadcast type of broadcasting the following paragraph; and
acquiring a paragraph corresponding to the paragraph number to be broadcasted from the first text as the next piece of broadcast data.

12. The method according to claim 1, further comprising:
generating the specified broadcast indication in response to detecting an operation on a touchscreen.

13. The method according to claim 1, wherein for a specific type of text line, a specific type identifier for representing the specific type of text line is stored, and a prompt is given to a user during broadcasting based on the specific type identifier.

14. The method according to claim 13, wherein the specific type of text line comprises at least one of:
a first type of text line, wherein the first type of text line is determined based on a text size; and
a second type of text line, wherein the second type of text line is determined based on text line definition.

15. An electronic device, comprising:
a processor; and
a memory storing a program, the program comprising instructions that, when executed by the processor, cause the electronic device to:
receive a specified broadcast indication, wherein the specified broadcast indication is used for indicating that a user requires the electronic device to broadcast specified data;
determine a current broadcast progress about broadcast data in response to the specified broadcast indication; and
acquire a next piece of broadcast data from a first text according to the current broadcast progress and the specified broadcast indication, wherein the first text is composed of text data recognized and stored for a text in a text area of an image;
the instructions, when executed by the processor, further cause the electronic device to:
perform character recognition on a text line to be recognized in the text area of the image to obtain text data, and store the text data of the text line in a first storage space as a line of data in the first text;
store the broadcast data in a third storage space; and
store association information for the broadcast data in a second storage space, wherein the association information is used for making the broadcast data in the third storage space positionally correspond to corresponding data in the first text in the first storage space,
wherein the association information for the broadcast data comprises at least:
  a position, in the first text, of each line of data in the corresponding data positionally corresponding to the broadcast data; and
  a cut-off proportion in the corresponding data for each line of data in the corresponding data,
    wherein the cut-off proportion in the corresponding data for each line of data in the corresponding data is determined based on a proportion of a number of characters from a start line of data in the corresponding data to the line of data to a total number of characters of the corresponding data.

16. A non-transitory computer-readable storage medium storing a program, the program comprising instructions that, when executed by a processor of an electronic device, cause the electronic device to:
receive a specified broadcast indication, wherein the specified broadcast indication is used for indicating that a user requires the electronic device to broadcast specified data;
determine a current broadcast progress about broadcast data in response to the specified broadcast indication; and
acquire a next piece of broadcast data from a first text according to the current broadcast progress and the specified broadcast indication, wherein the first text is composed of text data recognized and stored for a text in a text area of an image;
the instructions, when executed by the processor, further cause the electronic device to:
perform character recognition on a text line to be recognized in the text area of the image to obtain text data, and store the text data of the text line in a first storage space as a line of data in the first text;
store the broadcast data in a third storage space; and
store association information for the broadcast data in a second storage space, wherein the association information is used for making the broadcast data in the third storage space positionally correspond to corresponding data in the first text in the first storage space,
wherein the association information for the broadcast data comprises at least:
  a position, in the first text, of each line of data in the corresponding data positionally corresponding to the broadcast data; and
  a cut-off proportion in the corresponding data for each line of data in the corresponding data,
    wherein the cut-off proportion in the corresponding data for each line of data in the corresponding data is determined based on a proportion of a number of characters from a start line of data in the corresponding data to the line of data to a total number of characters of the corresponding data.

* * * * *